United States Patent
Yamada et al.

(10) Patent No.: US 11,521,387 B2
(45) Date of Patent: Dec. 6, 2022

(54) INFORMATION PROCESSING APPARATUS AND INFORMATION PROCESSING METHOD

(71) Applicant: SONY CORPORATION, Tokyo (JP)

(72) Inventors: Naohide Yamada, Tokyo (JP); Masakazu Murata, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/041,104

(22) PCT Filed: Jan. 29, 2019

(86) PCT No.: PCT/JP2019/002873
§ 371 (c)(1),
(2) Date: Sep. 24, 2020

(87) PCT Pub. No.: WO2019/193821
PCT Pub. Date: Oct. 10, 2019

(65) Prior Publication Data
US 2021/0117689 A1 Apr. 22, 2021

(30) Foreign Application Priority Data
Apr. 3, 2018 (JP) .............................. JP2018-071706

(51) Int. Cl.
*A61B 5/00* (2006.01)
*G16H 40/67* (2018.01)
(Continued)

(52) U.S. Cl.
CPC .......... *G06V 20/42* (2022.01); *G06F 16/7837* (2019.01); *G06V 20/47* (2022.01); *G06V 20/44* (2022.01)

(58) Field of Classification Search
CPC ........... G06K 9/00724; G06K 9/00751; G06K 2009/00738; G06F 16/7837;
(Continued)

(56) References Cited

U.S. PATENT DOCUMENTS 9,449,229 B1* 9/2016 Laska ................ H04N 21/4334
2005/0152665 A1 7/2005 Shibata et al.
(Continued)

FOREIGN PATENT DOCUMENTS

CN 104769939 A 7/2015
EP 2920960 A1 9/2015
(Continued)

OTHER PUBLICATIONS

International Search Report and Written Opinion of PCT Application No. PCT/JP2019/002873, dated Apr. 23, 2019, 11 pages of ISRWO.

(Continued)

*Primary Examiner* — Amandeep Saini
(74) *Attorney, Agent, or Firm* — Chip Law Group

(57) ABSTRACT

A clip image to be used as a highlight image, a replay image, or the like in a broadcast or the like is enabled to be generated easily and precisely. For this purpose, an information processing apparatus performs first processing for converting a received image signal into an image signal for real-time processing and transmitting the image signal to an analysis engine that is located outside. Furthermore, the information processing apparatus performs second processing for receiving event extraction information that has been received from the analysis engine and generating setting information of a clip image, by using the event extraction information.

19 Claims, 14 Drawing Sheets

(51) Int. Cl.
*G16H 40/20* (2018.01)
*A61B 6/00* (2006.01)
*A61B 6/12* (2006.01)
*A61B 90/00* (2016.01)
*A61B 34/20* (2016.01)
*G06V 20/40* (2022.01)
*G06F 16/783* (2019.01)

(58) Field of Classification Search
CPC .. G11B 27/031; G11B 27/28; H04N 21/8549; H04N 5/23299; H04N 7/18; H04N 5/91; H04N 5/765; H04N 5/232; G06V 20/42; G06V 20/47; G06V 20/44
USPC .......................................................... 382/103
See application file for complete search history.

(56) References Cited

U.S. PATENT DOCUMENTS

| | | | |
|---|---|---|---|
| 2011/0119716 A1 | 5/2011 | Coleman, Sr. | |
| 2012/0087640 A1 | 4/2012 | Kitamura et al. | |
| 2014/0315610 A1 | 10/2014 | Shachar et al. | |
| 2015/0018990 A1 | 1/2015 | Shachar et al. | |
| 2015/0206013 A1* | 7/2015 | Oguchi | G06F 16/58 |
| | | | 382/103 |
| 2016/0275356 A1* | 9/2016 | Kuwahara | G08B 13/19613 |
| 2018/0264342 A1 | 9/2018 | Shachar et al. | |

FOREIGN PATENT DOCUMENTS

| | | |
|---|---|---|
| JP | 2003-299010 A | 10/2003 |
| JP | 2005-295296 A | 10/2005 |
| JP | 2007-274400 A | 10/2007 |
| JP | 2012-084979 A | 4/2012 |
| JP | 2015-139016 A | 7/2015 |
| JP | 5962916 B2 | 8/2016 |
| JP | 2017-055175 A | 3/2017 |
| JP | 6307892 B2 | 4/2018 |
| KR | 10-2015-0087092 A | 7/2015 |
| TW | 201540065 A | 10/2015 |
| WO | 2003/085970 A1 | 10/2003 |
| WO | 2013/124856 A1 | 8/2013 |
| WO | 2014/076920 A1 | 5/2014 |
| WO | WO-2019193821 A1 * | 10/2019 ......... G06F 16/7837 |

OTHER PUBLICATIONS

Extended European Search Report of EP Application No. 19781822.2, dated Feb. 1, 2021, 09 pages.

Office Action for EP Patent Application No. 19781822.2, dated Jun. 8, 2022, 07 pages of Office Action.

* cited by examiner

FIG. 5

| INPUT/OUTPUT | PHASE | CATEGORY | OBJECT | | | PURPOSE |
|---|---|---|---|---|---|---|
| INPUT | GENERATE CLIP | DATA FOR ANALYSIS | CAMERA VIDEO | | Single / Multi | TRANSMIT TO ANALYSIS ENGINE |
| | | | CAMERA SOUND | | | |
| | | RESULT OF ANALYSIS ENGINE | RESULT OF ANALYSIS ENGINE | | Single / Multi | CANDIDATE FOR CUT-OUT RANGE |
| | | DATA FROM INSIDE-SYSTEM EQUIPMENT | CAMERA DATA | | DIAPHRAGM | INCREASE PRECISION |
| | | | | | FOCUS | |
| | | | | | ORIENTATION | |
| | | | | | RESOLUTION, FRAME RATE | |
| | | DATA FROM OUTSIDE-SYSTEM EQUIPMENT | GAME DATA | TELEMETRY DATA | | ADD METADATA |
| | | | | Stats | | ADD METADATA/INCREASE PRECISION |
| | SELECT CLIP | FEEDBACK INFORMATION | Clip TRANSFERRED TO REAR-STAGE OF SYSTEM | | | INCREASE ANALYSIS PRECISION EMULATE OPERATOR'S HABIT |
| | | | LENGTH OF USE, EDITING EDL | | | FEED BACK EDITION OR MODIFICATION |
| OUTPUT | | AUTOMATE REAR-STAGE PROCESSING | In/Out | | | GENERATE CLIP |
| | | | EDL | | | |
| | | | SELECT REAR-STAGE PROCESSING | | | AUTOMATE WORKFLOW |
| | GENERATE CLIP [CLIP SETTING INFORMATION] | ASSIST REAR-STAGE OPERATOR | METADATA | EVENT | | SEARCH FOR CLIP |
| | | | | TARGET OBJECT | | |
| | | | | duration VARIABLE LENGTH | | |
| | | | | INSERT AT ANOTHER CAMERA ANGLE | | REDUCE OPERATION OF REAR-STAGE OPERATOR |
| | | | | CHANGE REPRODUCTION SPEED | | |
| | | | | LEVEL OF RECOMMENDATION | | SELECTION INDEX OF REAR-STAGE OPERATOR |
| | CONTROL EQUIPMENT | CONTROL INSIDE-SYSTEM EQUIPMENT | CAMERA CONTROL DATA | | | CONTROL CAMERA ACQUIRE OPTIMUM CAMERA VIDEO FOR ANALYSIS EMULATE CAMERAMAN |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/002873 filed on Jan. 29, 2019, which claims priority benefit of Japanese Patent Application No. JP 2018-071706 filed in the Japan Patent Office on Apr. 3, 2018. Each of the above-referenced applications is hereby incorporated herein by reference in its entirety.

TECHNICAL FIELD

The present technology relates to an information processing apparatus, an information processing method, and a program, and relates to a technical field of generating a clip image from an image signal serving as, for example, a captured moving image video.

BACKGROUND ART

In some cases, a scene that is worth viewing is extracted, for example, from a moving image video captured for broadcasting, and is broadcast as a replay or a highlight.

Patent Document 1 described below describes a technology for detecting an event in a moving image.

CITATION LIST

Patent Document

Patent Document 1: Japanese Patent Application Laid-Open No. 2017-55175

SUMMARY OF THE INVENTION

Problems to be Solved by the Invention

It is an object of the present technology to quickly analyze an image (a moving image video) that has been captured in real time and perform processing using this analysis. Moreover, it is an object of the present technology to improve precision in processing or reduce a task burden imposed on a user.

Solutions to Problems

An information processing apparatus according to the present technology includes an event analyzer that performs first processing for converting a received image signal into an image signal for real-time processing and transmitting the image signal to an analysis engine that is located outside, and second processing for receiving event extraction information that has been received from the analysis engine and generating setting information of a clip image, by using the event extraction information.

For example, the information processing apparatus performs required processing as the first processing on an image signal serving as a real-time moving image that has been captured by an imaging device, and transmits the image signal to the analysis engine.

The analysis engine is an AI engine, extracts, from the received image signal, an event occurrence period that is suitable for a replay image or a highlight image, and transmits event extraction information indicating the event occurrence period.

As the second processing, the information processing apparatus generates setting information of a clip image serving as an image presenting an event on the basis of the event extraction information from the analysis engine.

In the information processing apparatus according to the present technology described above, it is conceivable that, in the first processing, the event analyzer determines whether or not information amount reduction processing will be performed on the image signal, by using an amount of information of the image signal and band information of a transmission line for transmission to the analysis engine.

Here, the capability of a transmission line serving as a wired/wireless communication line, such as bits per second (bps), communication capacity, or communication speed, is collectively referred to as a "band". In some cases, an image for real-time processing fails to be appropriately communicated depending on a band of what is called a transmission line and an amount of information of an image signal, namely, a frame rate and a resolution. Accordingly, it is determined that an amount of information will be reduced as needed.

In the information processing apparatus according to the present technology described above, it is conceivable that, in the information amount reduction processing, the event analyzer determines an amount of information after reduction, by using the band information and information relating to a precision of the analysis engine, the precision corresponding to the amount of information of the image signal.

In one aspect, the analysis precision of the analysis engine depends on an amount of information (a resolution or a frame rate) of an image signal. Stated another way, analysis precision changes according to an amount of information of an image signal. As an amount of information of an image signal decreases, analysis precision also decreases. Accordingly, with respect to an analysis engine serving as a transmission destination, a degree of reduction is determined by using information relating to analysis precision that corresponds to an amount of information of an image signal.

In the information processing apparatus according to the present technology described above, it is conceivable that, in the first processing, the event analyzer performs processing for encoding the received image signal into a streaming image signal and transmitting the streaming image signal to the analysis engine.

For example, an image signal serving as a real-time moving image is transmitted as a streaming image signal.

In the information processing apparatus according to the present technology described above, it is conceivable that, in the first processing, the event analyzer performs processing for dividing the received image signal into image periods having a fixed or unfixed time length, forming image files, and transmitting the image files to the analysis engine.

For example, an image signal serving as a real-time moving image is encoded into image files each including a scene of a period of about 5 to 10 seconds, and the image files are sequentially transmitted to the analysis engine.

In the information processing apparatus according to the present technology described above, it is conceivable that the event analyzer generates the image files in which front and rear image files include an overlapping partial scene, the front and rear image files being temporally continuous.

For example, in image files of a period of about 5 to 10 seconds, front and rear images are caused to include an overlapping scene of, for example, about one second.

In the information processing apparatus according to the present technology described above, it is conceivable that, in the second processing, the event analyzer generates the setting information obtained by updating an in-point or an out-point of the event extraction information that has been received from the analysis engine, the event extraction information including the in-point and the out-point.

An in-point and an out-point that have been presented by an external analysis engine are changed by using information that can be referred to.

In the information processing apparatus according to the present technology described above, it is conceivable that, in the second processing, the event analyzer generates the setting information by using information acquired from equipment in an image system, the equipment being connected.

For example, event extraction information including an in-point and an out-point that have been presented by the analysis engine are changed by using information from connected equipment in the image system. The equipment in the image system is a device that configures a system from imaging to an output of an image, for example, for a real-time broadcast, and examples include one or a plurality of imaging devices, a recording device (an image server), an image transmission control device (a switching device), and the like.

In the information processing apparatus according to the present technology described above, it is conceivable that, in the second processing, in a case where plural pieces of the event extraction information using an identical event as a target exist as the event extraction information that has been received from the analysis engine, the event analyzer generates the setting information of a clip image relating to the identical event, by using the plural pieces of the event extraction information.

For example, in a case where a certain scene has been imaged by a plurality of imaging devices, plural pieces of event extraction information relating to the same event are provided from the analysis engine in some cases. In this case, setting information is generated by using plural pieces of event extraction information using the same event as a target.

In the information processing apparatus according to the present technology described above, it is conceivable that, in the second processing, the event analyzer generates the setting information by using information acquired from equipment outside an image system, the equipment being connected.

Equipment outside the image system is equipment for which information can be acquired by the information processing apparatus by any means, e.g., a device for which information can be acquired via a network such as the Internet, and the like. An assumed example of acquired information is information from various pieces of equipment outside the image system in the present example.

In the information processing apparatus according to the present technology described above, it is conceivable that, in the second processing, the event analyzer generates the setting information including metadata control information, by using information acquired from equipment in an image system or equipment outside the image system.

The metadata control information is, for example, information instructing that various types of information be added as metadata to a clip image file, the content of metadata, or the like.

By doing this, an image clip added with various types of information, such as information relating to a player in a sports broadcast, information indicating the type of scene, or progress information, is caused to be generated as metadata.

In the information processing apparatus according to the present technology described above, it is conceivable that, in the second processing, the event analyzer generates the setting information including an evaluation value relating to event extraction.

For example, a degree of accuracy of event extraction (a value indicating whether or not a significant event has been appropriately extracted) is added as the evaluation value to setting information.

In the information processing apparatus according to the present technology described above, it is conceivable that, in a case where plural pieces of the event extraction information using an identical event as a target exist as the event extraction information that has been received from the analysis engine, the event analyzer increases the evaluation value for the setting information of a clip image relating to the identical event.

In a case where an identical scene has been imaged by a plurality of imaging devices and the identical scene has been acquired as plural pieces of event extraction information, there is a high probability that an important scene that has been imaged by the plurality of imaging devices has been extracted as an event. Accordingly, an evaluation value is increased.

In the information processing apparatus according to the present technology described above, it is conceivable that the event analyzer changes the evaluation value for the setting information based on the event extraction information, on the basis of operation information of an imaging device, the operation information relating to a scene indicated by the event extraction information.

For example, by referring to operation information of an imaging device for a scene designated by event extraction information, whether or not imaging has been appropriately performed can be determined. Accordingly, operation information is referred to, and an evaluation value is changed.

It is conceivable that the information processing apparatus according to the present technology described above further includes a feedback reception processing unit that receives feedback information from equipment in an image system, the equipment being connected, and performs predetermined processing.

For example, information relating to various operations of equipment that configures the image system is fed back to the information processing apparatus, and the information is reflected in predetermined processing of the information processing apparatus.

In the information processing apparatus according to the present technology described above, it is conceivable that the feedback information includes information relating to a clip image that has been used.

For example, selection information (use information) of a clip image selected (used) by the operator or the like is fed back, and is reflected in predetermined processing.

In the information processing apparatus according to the present technology described above, it is conceivable that the feedback reception processing unit performs operation control on an imaging device as the predetermined processing.

A more appropriate operation of the imaging device is determined on the basis of feedback information, and the imaging device is controlled.

In an information processing method according to the present technology, an information processing apparatus performs first processing for converting a received image signal into an image signal for real-time processing and transmitting the image signal to an analysis engine that is located outside, and second processing for receiving event extraction information that has been received from the analysis engine and generating setting information of a clip image, by using the event extraction information.

By doing this, the efficiency and precision of event extraction are improved.

A program according to the present technology is a program that causes the information processing apparatus to perform processing according to this information processing method.

By doing this, the information processing apparatus according to the present technology can be easily implemented.

Effects of the Invention

According to the present technology, efficiency can be improved in a task of extracting a clip image in a short time together with capturing a moving image video, and a task burden imposed on an operator to generate an appropriate clip can be reduced.

Note that the effects described here are not necessarily restrictive, and any of effects described in the present disclosure may be exhibited.

BRIEF DESCRIPTION OF DRAWINGS

FIG. 5 is an explanatory diagram of an input/output of the information processing apparatus according to the embodiment.

MODE FOR CARRYING OUT THE INVENTION

An embodiment is described below in the following order.
<1. System configuration>
<2. Outline of processing>
<3. Image transmission for event analysis>
<4. Processing for generating clip setting information>
<5. Operation using feedback information>
<6. Example of utilization in endoscopic surgery system>
<7. Example of utilization in moving body>
<8. Summary and variations>
<1. System Configuration>

An image system 10 according to the embodiment and its peripheral configuration are described with reference to FIG. 1.

Figure 1:
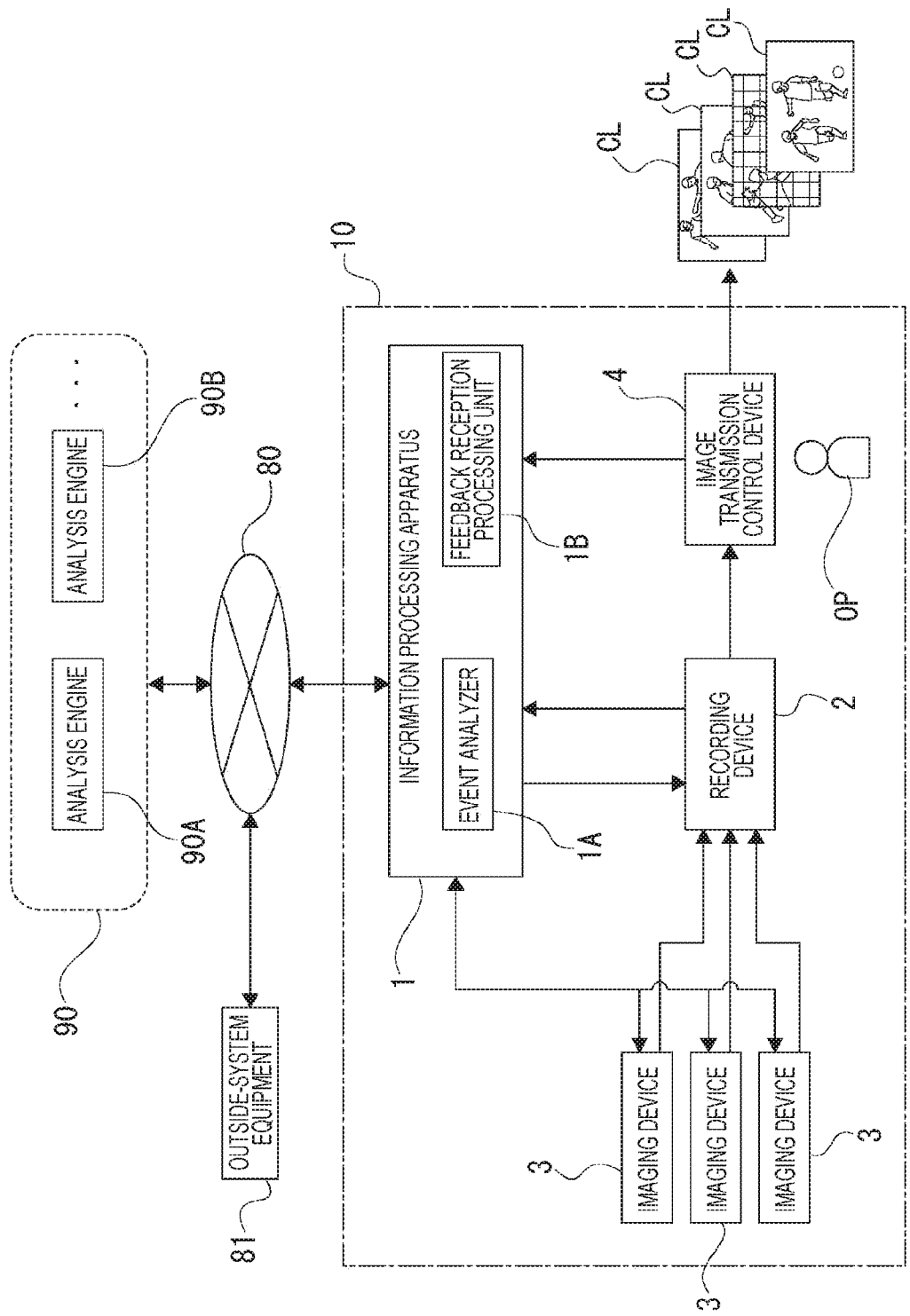
FIG. 1 is a block diagram of a system configuration according to an embodiment of the present technology.

Note that it is assumed that the image system 10 according to the embodiment is a system that captures an image that can be used, for example, in a broadcast or the like, and refers to an information processing apparatus 1, a recording device 2, imaging devices 3, and an image transmission control device 4 in FIG. 1.

Needless to say, this is an example, and another device may be included in the image system 10, or some of the devices described above may be omitted. For example, the recording device 2 and the image transmission control device 4 may be integrated. Furthermore, the information processing apparatus 1 may be integrated with the recording device 2 and the image transmission control device 4.

It is assumed that equipment to which a series of image signals is transferred to record a broadcast video and its direct control equipment are pieces of equipment in the image system 10.

Moreover, in the description of the present embodiment, an "image" principally refers to a moving image video. Needless to say, a still image may be included.

A moving image video signal captured in real time, a clip image that has been cut out of the moving image video, a signal in a state of transferring these moving image videos, and the like are referred to as an "image signal".

The imaging device 3 is, for example, a video camera that captures an image for broadcasting. For example, in order to relay a sports competition or the like, a plurality of imaging devices 3 is used, and a broadcast is made while images from the respective imaging devices 3 are switched in many cases.

One or a plurality of imaging devices 3 outputs a captured image signal to the recording device 2.

The recording device 2 functions as what is called a real-time image signal server device that accumulates or transmits an image signal captured by each of the imaging devices 3. Furthermore, signal processing or processing such as cutting-out editing or clip image generation is also performed on an image signal.

Therefore, the recording device 2 has a configuration that serves as a large-capacity storage, a signal processing unit serving as an image signal processing processor, and a controller that transfers a signal to other equipment, communicates various types of information with other equipment, and the like.

The image transmission control device 4 is a switcher terminal operated by an operator OP.

The image transmission control device 4 selects an image signal that has been captured by each of the imaging devices 3 and has been transferred as a real-time image via the recording device 2 or an image signal that has been generated by the recording device 2 and serves as a clip image, on the basis of an operation performed by the operator OP, and transmits the image signal to a not-illustrated rear stage. Therefore, the image transmission control device 4 includes an interface serving as a display function or an operation function for the operator OP (a switching operator), or a function of communicating an image signal or various types of information with other equipment.

Note that the image transmission control device 4 may be integrated with the recording device 2 or may share part of a device with the recording device 2, as a workstation for broadcasting.

During broadcasting, the operator OP that operates the image transmission control device 4 performs an operation to select an imaging device 3 that has captured an image to be broadcast as a real-time image, or an operation to insert a clip image CL. The clip image CL is, for example, a replay scene, a highlight scene, or the like.

In the present embodiment, the generation of a clip image is principally described.

The information processing apparatus 1 performs processing for generating a clip image CL. In particular, the precise and automatic generation of a clip image is achieved.

The clip image CL is obtained by extracting an event from a real-time image signal acquired by the imaging device 3 and cutting out a portion indicating the event in such a way that the clip image CL can be used as a highlight scene or a replay scene in a broadcast.

For this purpose, it is requested that a situation that is particularly worth viewing be precisely extracted as an event from an image signal that has been recorded in real time, and a section (an in-point and an out-point of an image signal) of the extracted event be designated and be cut out as a clip image.

The event described here is not particularly limited, but is defined as a scene indicating that a certain type of phenomenon has occurred in a captured image. Examples include a scene that is particularly worth viewing, a scene that is important to a broadcast target such as a competition, and the like. Stated another way, in a captured image, a phenomenon that is a candidate for a clip image CL or a scene range of the phenomenon is referred to as an event.

Normally, the extraction of an event and the designation of an in-point and an out-point, as described above, are performed visually and manually by an operator for clip generation. Normally, the operator described here refers to a staff that is different from the switching operator OP described above.

An operator for event extraction performs a task of manually taking out an important scene while viewing the entirety of a recorded video. Therefore, it is difficult to efficiently perform the task.

Furthermore, a technology for automatically taking out an event by performing image analysis has been proposed. However, in image analysis, an image file of a certain length of time is used, and it has been difficult to perform clip cutting-out in a short time, for example, in order to cut out a replay scene during broadcasting.

Moreover, even in a case where image analysis is automatically performed, if a result of extraction of an analysis engine is relied on, the precision of cutting out fails to be increased. In some cases, an important event fails to be extracted, or many unnecessary events are extracted.

Accordingly, in the present embodiment, the information processing apparatus 1 implements processing for automatically extracting an event, and causes the precision of cutting out the event to be improved.

In particular, the information processing apparatus 1 is a computer device (an arithmetic processing unit) in which application software that can be used to produce a replay image or a later highlight image in a sports broadcast or the like has been installed, and has functions of an event analyzer 1A and a feedback reception processing unit 1B, as illustrated. These functions are described later.

The information processing apparatus 1 acquires an image signal accumulated in the recording device 2, or transmits a control signal to the recording device 2.

Further, the information processing apparatus 1 may acquire information from the image transmission control device 4.

Furthermore, the information processing apparatus 1 may transmit information to the imaging device 3.

Note that the image transmission control device 4 may be implemented as a device that has been integrated with one of or both the recording device 2 and the image transmission control device 4 as a workstation for broadcasting, or may share part of a device with the recording device 2 or the image transmission control device 4.

The information processing apparatus 1 is communicable with, for example, an analysis engine 90 (90A, 90B, . . . ) serving as an external artificial intelligence (AI) engine or outside-system equipment 81, for example, via a transmission line 80. The transmission line 80 is assumed to have various forms such as the Internet, a local area network (LAN), a virtual private network (VPN), an intranet, an extranet, a satellite communication network, a community antenna television (CATV) communication network, a telephone network, or a mobile communication network.

The analysis engine 90 indicates an external AI engine that can be used by the image system 10 in the present example. A plurality of analysis engines 90 is provided to be available, and is respectively illustrated as analysis engines 90A, 90B, . . . . Hereinafter, in a case where any individual analysis engine of these analysis engines is referred to or in a case where these analysis engines are collectively referred to, the term "analysis engine 90" is used.

The outside-system equipment 81 refers to various types of equipment, an information processing apparatus, a server, or the like that are communicable via the transmission line 80. In particular, equipment that can provide the information processing apparatus 1 with information relating to a target to be imaged (broadcast) is assumed.

Figure 2:
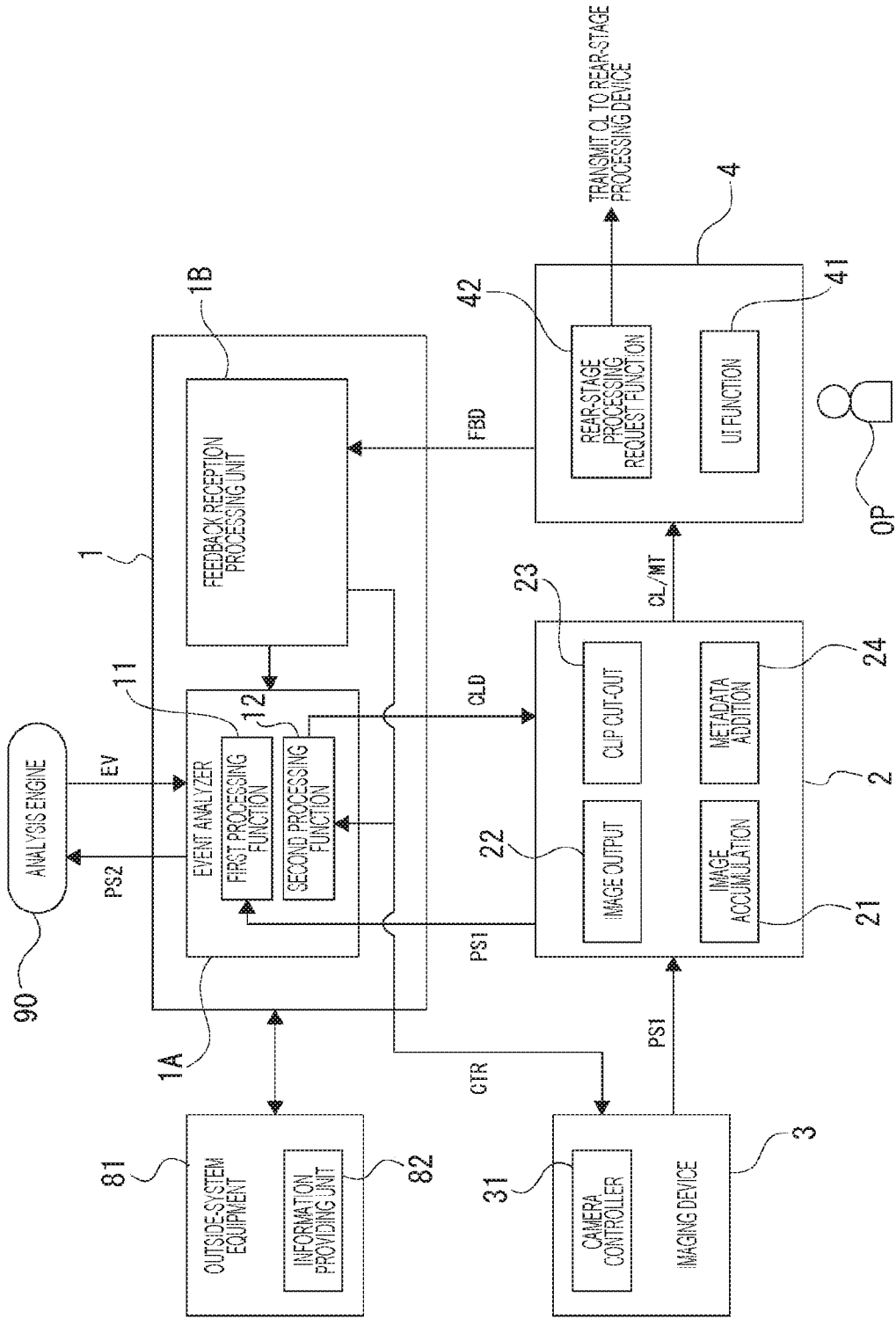
FIG. 2 is a block diagram of a functional configuration according to the embodiment.

Operation functions of respective pieces of equipment illustrated in FIG. 1 are described with reference to FIG. 2.

The imaging device 3 supplies a captured image signal PS1 to the recording device 2. An example is an image signal serving as a live video of sports or the like.

A camera controller 31 indicates a controller using a microcomputer in the imaging device 3. The camera controller 31 controls an operation performed by a cameraman or an imaging operation of the imaging device 3 on the basis of a control signal CTR from the outside. For example, the camera controller 31 controls a focus state, a zoom state, an imaging direction (panning/tilting), or the like on the basis of a control signal CTR.

The recording device 2 includes an image accumulation function 21, an image output function 22, a clip cut-out function 23, and a metadata addition function 24.

The image accumulation function 21 is a function of accumulating an image signal PS1 from the imaging device 3 transitorily or in a long term to some extent.

The image output function 22 is a function of supplying the image signal PS1 to the information processing apparatus 1.

The clip cut-out function 23 is a function of cutting out a clip image on the basis of setting information CLD from the information processing apparatus 1. Stated another way, the clip cut-out function 23 performs cutting out from among the image signals PS1 accumulated by the image accumulation function 21 in accordance with an in-point and an out-point that are included in the setting information CLD, and generates a clip image CL.

The metadata addition function 24 is a function of acquiring metadata control information included in the setting information CLD from the information processing apparatus 1 and adding metadata MT to the clip image CL on the basis of this. By doing this, a clip image CL to which metadata MT designated by the information processing apparatus 1 has been added is generated.

The image transmission control device 4 includes a user interface (UI) function 41 and a rear-stage processing request function 42.

The UI function 41 includes a display function and an operation function. By using the display function, a real-time image from each of the imaging devices 3 is displayed to the operator OP, or a list of clip images CL that have been generated to be able to be inserted as a broadcast video or a reproduction image is displayed to the operator OP. Furthermore, by using the operation function, a switching operation, a clip selection operation, or the like that has been performed by the operator OP is received.

The rear-stage processing request function 42 is a function of supplying an image signal for broadcasting (including a clip image CL) to a not-illustrated rear-stage device and making a required processing request based on an operation performed by the operator OP, to the not-illustrated rear-stage device. For example, a required request is made by transmitting, to a rear stage, edit decision list (EDL) data indicating an instruction to use a clip image CL with no change or use the clip image CL by a predetermined time length (time-scale), an instruction relating to image quality adjustment, image effect, or the like, or another instruction.

Note that the image transmission control device 4 can transmit, for example, information relating to a clip image CL selected by the operator OP, information relating to a length that has been used, the EDL data, or the like as feedback information FBD to the information processing apparatus 1.

The information processing apparatus 1 includes an event analyzer 1A and a feedback reception processing unit 1B.

The event analyzer 1A receives, as a principal input, an image signal PS1 serving as a video that has been recorded live, and performs processing for effective clip generation. This event analyzer 1A performs processing as a first processing function 11 and processing as a second processing function 12.

The first processing function 11 performs first processing for performing required processing on a received image signal PS1, that is, an image signal captured by the imaging device 3 in this case, and transmitting, to an external analysis engine 90, the image signal as an image signal PS2 for real-time processing.

The second processing function 12 receives event extraction information EV received from the analysis engine 90, and performs second processing for generating setting information CLD of a clip image by using the event extraction information. Furthermore, the second processing function 12 also performs processing for generating metadata control information by using information from the outside-system equipment 81 or information from equipment in the image system 10, and transmitting this as part of the setting information CLD to the recording device 2. The metadata control information is, for example, information instructing that various types of information be added as metadata to a clip image file, or information indicating the content itself of metadata, or the like.

Furthermore, the second processing function 12 can acquire operation information from equipment in the image system 10, such as the imaging device 3, and can reflect this in the generation of the setting information CLD.

The feedback reception processing unit 1B receives feedback information FBD from equipment in the image system 10, and performs predetermined processing. For example, feedback information FBD such as clip selection information is received from the image transmission control device 4. Needless to say, information from the imaging device 3 or the recording device 2 may be received as the feedback information FBD.

Then, the feedback unit 1B transfers the feedback information FBD to the event analyzer 1A in such a way that the feedback information FBD can be used to generate metadata control information (for example, the content of metadata), or generates, for example, a control signal CTR in such a way that, for example, operation control can be performed on the imaging device 3.

The analysis engine 90 receives the image signal PS2 from the information processing apparatus 1, performs analysis, and extracts an event. Then, event extraction information EV indicating the extracted event is returned to the information processing apparatus 1. The event extraction information EV includes, for example, an in-point and an out-point using a time stamp (hour: minute: second: frame) in the image signal PS2.

The outside-system equipment 81 includes a function of an information providing unit 82, and can transmit data to the information processing apparatus 1 in response to, for example, a data request from the information processing apparatus 1. For example, data serving as related information of a sports game imaged by the imaging device 3, data relating to players, data relating to the progress of the game, or other data can be provided to the information processing apparatus 1.

Figure 3:
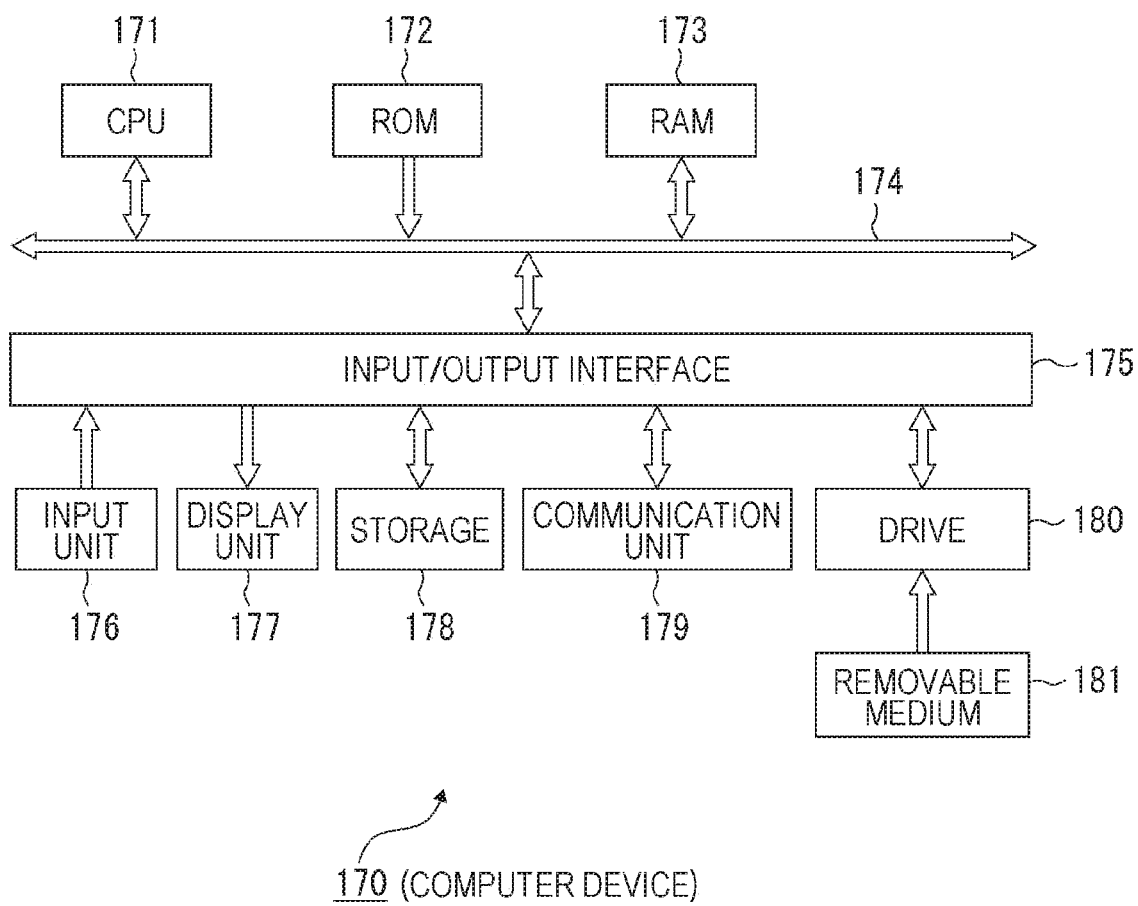
FIG. 3 is a block diagram of a configuration of an information processing apparatus according to the embodiment.

In the configuration described above, the information processing apparatus 1, the recording device 2, and the image transmission control device 4 can be implemented, for example, by a computer device 170, as illustrated in FIG. 3, as a hardware configuration.

In FIG. 3, a central processing unit (CPU) 171 of the computer device 170 performs various types of processing in accordance with a program stored in a read only memory (ROM) 172 or a program loaded into a random access memory (RAM) 173 from a storage 178. Data required for the CPU 171 to perform various types of processing, or the like is also appropriately stored in the RAM 173.

The CPU 171, the ROM 172, and the RAM 173 are connected to each other via a bus 174. This bus 174 is also connected to an input/output interface 175.

The input/output interface 175 is connected to an input unit 176 that includes a keyboard, a mouse, or the like, an output unit 177 that includes a display including a liquid crystal display (LCD), an organic electro-luminescence (EL) panel, or the like, a speaker, and the like, a storage 178 that is configured by a hard disk or the like, and a communication unit 179 that is configured by a modem or the like.

The communication unit 179 performs communication processing via a network, such as the Internet, that is illustrated as the transmission line 80, or performs communication using wired/wireless communication, bus communication, or the like in the image system 10.

The input/output interface 175 is also connected to a drive 180, as needed, a removable medium 181, such as a magnetic disk, an optical disk, a magneto-optical disk, or a semiconductor memory, is appropriately attached, and a computer program read from them is installed in the storage 178, as needed.

In a case where the functions described above of the information processing apparatus 1 are implemented by software, a program that configures the software is installed from a network or a recording medium.

This recording medium is configured by the removable medium 181 that is distributed to deliver the program to a user and that includes a magnetic disk, an optical disk, a magneto-optical disk, a semiconductor memory, or the like in which the program has been recorded. Alternatively, this recording medium is also configured by a hard disk or the like that is delivered to a user in a state incorporated in advance into a device body and that is included in the ROM 172 or the storage 178 in which the program has been recorded.

In a case where the computer device 170, as described above, is the information processing apparatus 1, as a reception operation of the communication unit 179, for example, when an image signal PS1 is received or when the event extraction information EV from the analysis engine 90 is received, the CPU 171 performs the processing described above (the first processing and the second processing) of the event analyzer 1A on the basis of a program. Furthermore, the CPU 171 can perform the processing described above of the feedback reception processing unit 1B on the basis of the program by using the received feedback information FBD.

<2. Outline of Processing>

The outline of processing according to the present embodiment is described with reference to FIG. 4. This outline of processing principally describes a process of generating a clip image CL from an image signal PS1 captured by the imaging device 3.

Figure 4:
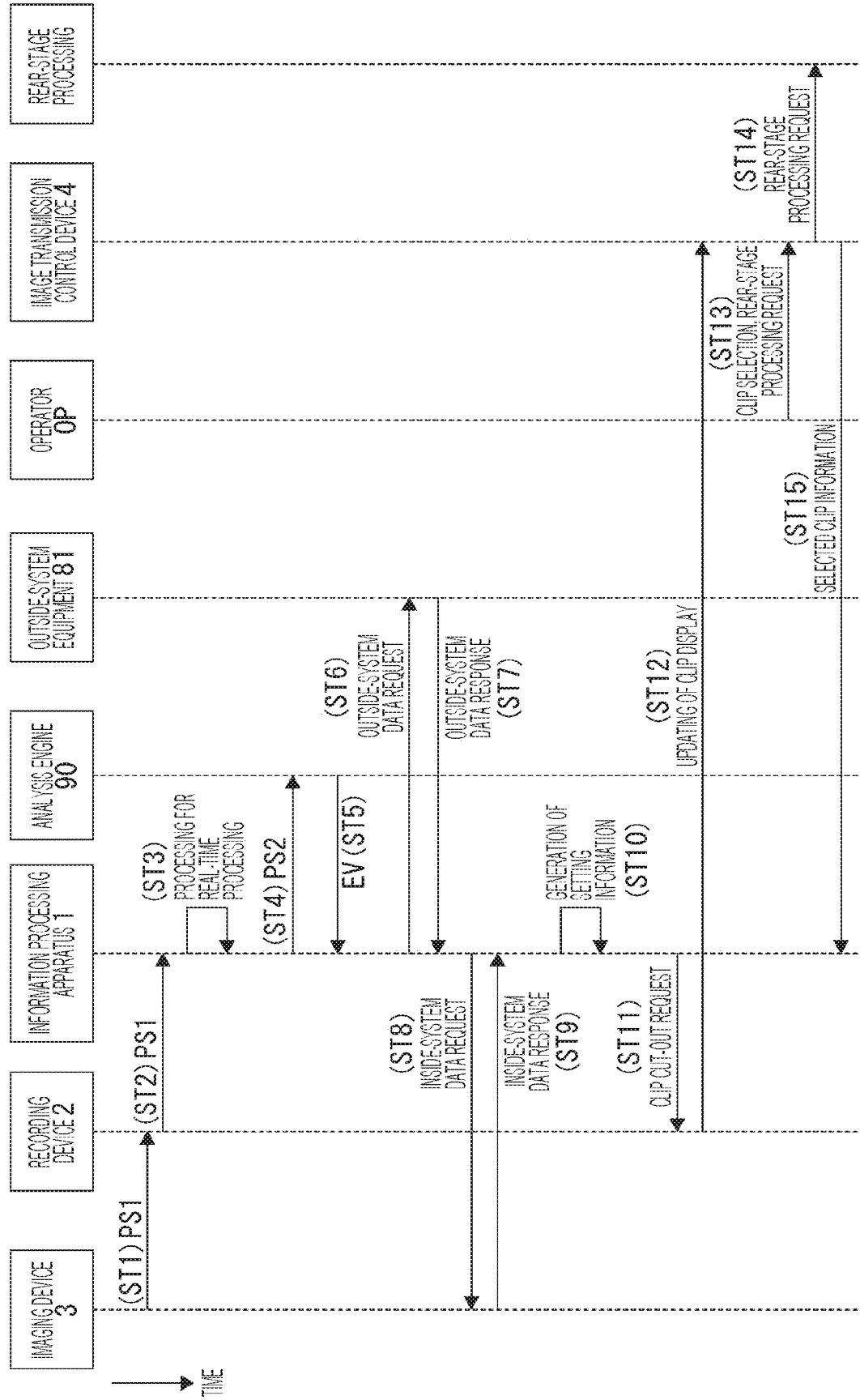
FIG. 4 is an explanatory diagram of a system operation according to the embodiment.

FIG. 4 illustrates flows of operations of respective units as the imaging device 3, the recording device 2, the information processing apparatus 1, the analysis engine 90, the outside-system equipment 81, the operator OP, the image transmission control device 4, and the rear-stage processing. A vertical direction in the drawing indicates a time axis.

Respective operations or processes are described as (ST1) to (ST15) along the time axis.

(ST1)

The imaging device 3 transmits an image signal PS1 obtained by imaging to the recording device 2. Note that, in practice, in a case where the imaging device 3 captures an image signal PS1 serving as a live moving image, this image signal PS1 is continuously transmitted to the recording device 2 during broadcasting.

The recording device 2 accumulates the image signals PS1.

Furthermore, it is assumed that a plurality of imaging devices 3 is used, as illustrated in FIG. 1. In this case, each of the image signals PS1 from the respective imaging devices 3 is transmitted to the recording device 2, and is accumulated.

(ST2)

The recording device 2 transmits, to the information processing apparatus 1, the image signal PS1 from the imaging device 3 in almost real time. Note that, in practice, this is also continuously performed. Furthermore, each of the image signals PS1 from a plurality of imaging devices 3 is transmitted to the information processing apparatus 1 in almost real time.

(ST3)

The information processing apparatus 1 performs, on the received image signal PS1, processing for converting the received image signal PS1 into an image signal for real-time processing and transmitting the image signal to an external analysis engine 90. In order to maintain a real-time property, the information processing apparatus 1 performs, for example, processing for encoding the image signal PS1 to a streaming image signal for transmission or processing for dividing the image signal PS1 into image files of a predetermined short time unit and performing encoding. By performing these pieces of processing, an image signal PS2 to be transmitted to the analysis engine 90 is generated.

(ST4)

The information processing apparatus 1 transmits the image signal PS2 to the analysis engine 90.

(ST1) to (ST4) described above are continuously performed during a period during which the imaging device 3 is performing imaging, for example, during broadcasting.

(ST5)

The analysis engine 90 analyzes the received image signal PS2, and transmits event extraction information EV to the information processing apparatus 1 every time an event is detected.

The information processing apparatus 1 receives the event extraction information EV. The event extraction information EV includes an in-point and an out-point using a time stamp added to the image signal PS2 (PS1), and therefore the information processing apparatus 1 can recognize a section of an event image serving as a candidate to be cut out as a clip.

(ST6)

The information processing apparatus 1 requests outside-system data from the outside-system equipment 81. Related information, such as information relating to a game that is being imaged or information relating to players, is requested.

(ST7)

In response to this request, outside-system data is transmitted from the outside-system equipment 81. The information processing apparatus 1 receives this, and acquires data relating to the broadcast content.

(ST8)

The information processing apparatus 1 requests inside-system data from inside-system equipment (for example, the imaging device 3). For example, information relating to an imaging operation for the image signal PS1 is requested from the imaging device 3. The information relating to the imaging operation is assumed to be information indicating, for example, a focus state, a zoom state, an imaging direction, an aperture value, an amount of information (a resolution or a frame rate), or the like.

(ST9)

In response to this request, inside-system data is transmitted from the inside-system equipment (the imaging device 3). The information processing apparatus 1 receives this, and acquires data relating to the image signal PS1.

Note that the information processing apparatus 1 may request, from the image transmission control device 4, information such as operation information relating to image quality adjustment, an image effect, or the like performed by the operator OP or luminance setting information, and may acquire this information.

Note that, in this example, (ST8) and (ST9) are performed after (ST6) and (ST7) described above, but processing may be performed in reverse order.

(ST10)

The information processing apparatus 1 performs processing for generating setting information CLD for the generation of a clip image CL. For example, an in-point and an out-point serving as the event extraction information EV are used or corrected, and an in-point and an out-point for cutting out a clip image CL are determined.

Further, the inside-system data is used, and an evaluation value relating to event extraction is set.

Furthermore, the outside-system data is used, and metadata control information including the content of metadata is generated.

(ST11)

The information processing apparatus 1 transmits the generated setting information CLD to the recording device 2, and requests that the recording device 2 cut out a clip. In some cases, the setting information CLD includes the metadata control information or the evaluation value.

(ST12)

The recording device 2 cuts out a clip image CL on the basis of the setting information CLD. In some cases, the recording device 2 adds metadata MT to a file serving as the clip image CL in accordance with the metadata control information.

Then, the recording device 2 provides the image transmission control device 4 with information for updating a display in such a way that presentation to the operator OP is made in a state where a new clip image CL has been added.

The operator OP can confirm that a new clip image CL has been generated, on a UI screen, for example, like a clip list screen. The evaluation value or the metadata MT is also presented to the operator OP.

(ST13)

The operator OP checks a clip image by using the UI function 41 in the image transmission control device 4, and can perform an operation to select a clip image CL to be broadcast, or another operation.

(ST14)

The image transmission control device 4 gives the designation of an image signal to be used in a broadcast to a rear-stage device on the basis of an operation of the operator OP, reads the image signal from the recording device 2, transmits the image signal to the rear-stage device, and requests required processing. By performing this processing, an image signal of a clip image CL selected by the operator OP is supplied to the rear-stage device.

(ST15)

In a case where the operator has selected a clip, selected clip information indicating the selected clip is transmitted from the image transmission control device 4 to the information processing apparatus 1. The information processing apparatus 1 can use the selected clip information, for example, to analyze a tendency of clip selection of the operator OP.

A series of operations for the automatic generation of a clip image CL and clip selection performed by the operator OP has been described above.

In the present embodiment, an event is automatically extracted from an image signal PS1 that has been recorded live, and a clip image CL is cut out. The generated clip image CL is presented to the operator OP at any time. For example, a list of clip images CL generated during broadcasting is presented to the operator OP.

The operator OP can arbitrarily select a clip image CL, and can transmit the clip image CL as an image to be used in a broadcast to a rear stage.

In the image system 10, as described above, the information processing apparatus 1 principally performs processing for automatically generating a clip image CL. Respective examples of an input to the information processing apparatus 1 and an output from the information processing apparatus 1 are described.

FIG. 5 illustrates examples of data that is input to or output from the information processing apparatus 1 principally in a process of the operation of FIG. 4, in the form of a list.

First, examples of an input to the information processing apparatus 1 that relates to clip generation include data for analysis in (ST2) described above, data of a result of the analysis engine in (ST5) described above, data from the inside-system equipment in (ST9) described above, and data from the outside-system equipment in (ST7) described above.

The data for analysis is a camera video, that is, an image signal PS1. An image signal PS1 serving as a video from one camera or image signals PS1 serving as videos from a plurality of cameras are input. Note that the image signal PS1 includes a sound signal (camera sound) that has been recorded by the imaging device 3.

This data for analysis is input to the information processing apparatus 1 for the purpose of transmission to the analysis engine 90.

Note that an input of image signals PS1 from a plurality of imaging device 3 is used to evaluate an event, for example, in such a way that a degree of accuracy increases if the same event has occurred in a plurality of cameras.

As the data of the result of the analysis engine 90, the event extraction information EV is input to the information processing apparatus 1. This event extraction information EV is also transmitted from the analysis engine 90 with respect to a video of one camera or a video of each of a plurality of cameras. The event extraction information EV is handled as a candidate for a clip cutting-out range by the information processing apparatus 1.

An input from other equipment in the image system 10 is assumed to be camera data from the imaging device 3.

Examples of the camera data described here include an aperture value, a focus value, an imaging direction, an amount of information (a resolution or a frame rate), and the like. These can be used to improve the precision of clip cutting-out. Stated another way, the camera data can be used to refine event extraction information EV serving as a result of analysis in AI processing in the analysis engine 90.

The data from the outside-system equipment 81 is assumed to be telemetry data or game data.

By using, as telemetry data, various types of measurement data during a game that is being imaged, the information processing apparatus 1 can generate the content of metadata, and can generate metadata control information in such a way that the metadata control information is incorporated into a clip image CL.

Furthermore, event time, a score, player information relating to a main player or the like, and the like become apparent from game data, that is, data relating to a game that is being imaged. This can be used for the information processing apparatus 1 to generate the content of metadata, or can be used to improve the precision of clip extraction.

An example of an input to the information processing apparatus 1 is feedback information FBD relating to clip selection, as described as selected clip information in (ST15) described above.

Examples of this feedback information FBD include information relating to a clip image CL that has been transmitted to a rear stage of a system in accordance with a selection operation or the like that has been performed by the operator OP, a length that has been used (information relating to what is called a time scale), EDL data, and the like.

The information processing apparatus 1 can use information relating to the selected clip image CL to improve the precision of analysis or emulate a habit of the operator OP. For example, the information relating to the selected clip image CL can be used to learn which type of clip tends to be used.

Furthermore, the information processing apparatus 1 can emulate a habit (a tendency to determine a clip image to be adopted) of the operator on the basis of the angle of an image or the size of a player in the image.

The information processing apparatus 1 can feed back editing or modification to the setting information CLD of the clip image CL, by using information relating to a length that has been used or EDL data. For example, if it is known what scene will be used by what length, a cutting-out time can be optimized. Furthermore, it is also conceivable that how reproduction speed or the like has been changed with respect to a time scale is fed back.

Examples of an output from the information processing apparatus 1 that relate to clip generation include data for automating rear-stage processing and data for assisting a rear-stage operator in (ST11) described above. Stated another way, the output from the information processing apparatus 1 is an output serving as setting information CLD.

An example of the setting information CLD is an in-point and an out-point. These are transmitted to the recording device 2 as information relating to the designation of a clip cutting-out position.

The setting information CLD can also include EDL data. A conceivable example is processing for emulating the editing of an operator if the operator is set.

The setting information CLD can also include, as a rear-stage processing request, information for automating a workflow. For example, information indicating whether or not an archive will be formed or information relating to an archive destination is designated.

An example of information for assisting the operator OP in a rear stage is metadata control information.

With respect to a clip image CL to be cut out, the information processing apparatus 1 causes the setting information CLD to include metadata control information including the content of metadata such as a clip name, an evaluation value, game data, or telemetry data.

This enables a clip name that is easy to understand to be automatically given, or enables a plurality of clip images CL to be collected for each event, for example, in such a way that search can be easily performed later.

By adding player information or the like as the content of metadata, the searchability of a clip image using a person, a uniform number, or the like can be improved.

The information processing apparatus 1 may cause the setting information CLD to include information relating to a variable length of duration as information for assisting the operator OP. An example is information obtained by detecting an estimated difference between an event detection result and a clip length that is usually used in a replay or the like.

Furthermore, the information processing apparatus 1 may cause the setting information CLD to include information for proposing a combination with a camera image at another angle. An example is information for proposing that an image in which the same event has been captured at another angle be inserted.

Furthermore, the information processing apparatus 1 may cause the setting information CLD to include information for proposing that reproduction speed be changed. An example is information for proposing how reproduction speed be changed with respect to a remaining time scale. It is proposed, for example, that reproduction speed be changed at about a highest degree of accuracy from among degrees of accuracy per second.

These pieces of information enable a reduction in an operation performed by the operator OP in a rear stage.

Furthermore, the information processing apparatus 1 may cause the setting information CLD to include information indicating the level of recommendation. The information serves as a selection index in assistance for the operator in the rear stage, and this makes it easy to select an optimum clip or scene. It is assumed, for example, that a target player is extracted from competition data and a camera image indicating the player is recommended.

An example of an output from the information processing apparatus 1 is information for controlling equipment in the image system 10, for example, camera control data serving as a control signal CTR for the imaging device 3.

It is conceivable, for example, that a focus state, a diaphragm, panning/tilting, or the like of the imaging device 3 is controlled in accordance with a result of clip selection. Furthermore, control can be performed in such a way that a habit (a focus, a degree of approach to a player, or the like) of a cameraman is learnt and the cameraman is emulated.

<3. Image Transmission for Event Analysis>

A specific example of processing performed by the information processing apparatus 1 is described below.

Figure 6:
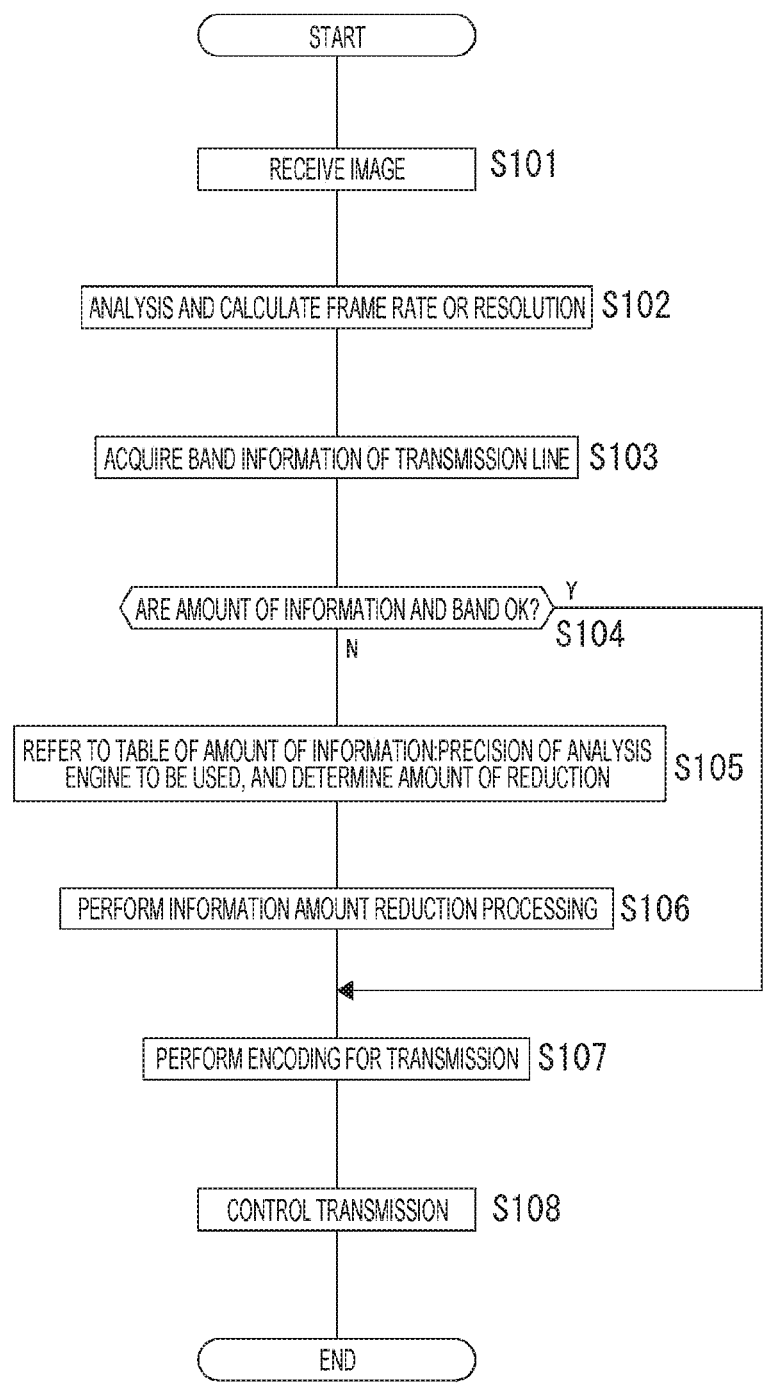
FIG. 6 is a flowchart of image transmission processing for event analysis of the information processing apparatus according to the embodiment.

FIG. 6 illustrates an example of the first processing that the information processing apparatus 1 performs by using a function of the event analyzer 1A. Stated another way, FIG. 6 illustrates an example of processing for converting an image signal PS1 received from the recording device 2 into an image signal for real-time processing and transmitting the image signal to an external analysis engine.

In step S101, the information processing apparatus 1 receives an image signal PS1 from the recording device 2.

In step S102, the information processing apparatus 1 analyzes the image signal PS1, and calculates an amount of information, namely, a frame rate or a resolution. Note that, if information relating to a frame rate or a resolution has been provided from the imaging device 3 or the recording device 2, it is not necessary to analyze the image signal and calculate the frame rate or the resolution.

In step S103, the information processing apparatus 1 acquires band information of the transmission line 80. In this case, a certain analysis engine 90 is selected, and an image signal PS2 is transmitted. Band information of the transmission line 80 for the certain analysis engine 90 is acquired.

Note that, here, the capability of a transmission line serving as a wired/wireless communication line, such as bps, communication capacity, or communication speed, is collectively referred to as a "band".

In step S104, the information processing apparatus 1 determines whether or not the image signal PS2 can be transmitted at a speed that does not impair a real-time property, on the basis of the amount of information that has been obtained in step S102 and the band information that has been acquired in step S103.

Stated another way, an amount of information of an image signal PS2 obtained by encoding an image signal PS1 can be obtained from an amount of information of the image signal PS1. Therefore, it is determined whether or not a current band state of the transmission line 80 for transmission to an analysis engine 90 serving as a transmission destination is sufficient for the transmission of the image signal PS2.

In a case where it has been determined that the band of the transmission line 80 is sufficient, the processing moves on to step S107, and the information processing apparatus 1 performs encoding processing for transmission, and generates an image signal PS2 to be transmitted.

For example, the information processing apparatus 1 performs encoding processing for transmission as a streaming image signal. Alternatively, the information processing apparatus 1 performs encoding processing for sharing a file as a video file that has been divided into fine pieces of about 5 seconds to about 10 seconds or for performing transfer to the analysis engine 90 in hypertext transfer protocol (HTTP) or file transfer protocol (FTP) transfer.

By doing this, the image signal PS2 is transferred to the analysis engine 90 at an almost real-time speed, and the analysis engine 90 extracts an event having a real-time property.

Note that, in these pieces of encoding processing, the information processing apparatus 1 receives an image signal PS1 from the recording device 2 as a serial digital interface (SDI) signal, and changes the image signal PS1 into a file of a general-purpose format that enables the analysis engine 90 to receive the file, such as H.264.

Then, in step S108, the information processing apparatus 1 transmits the image signal PS2 to the analysis engine 90 via the transmission line 80.

In contrast, in a case where it has been determined in step S104 that the band is not sufficient for transfer that does not impair the real-time property of an image signal PS2, the information processing apparatus 1 performs setting to reduce an amount of information in step S105. Stated another way, it is determined to what extent an amount of information is required to be reduced.

The analysis engines 90A, 90B, . . . that are provided to be available are different in an analysis method or precision. Then, in image analysis, the precision of analysis also changes according to an amount of information (a resolution or a frame rate) of an input image.

Accordingly, the information processing apparatus 1 holds, for each analysis engine 90 to be used, the precision of analysis (in this case, event extraction precision) with respect to an amount of information of image data in the form of table information or the like.

Then, in step S105, table data relating to an analysis engine 90 to be used this time (that is, a transmission destination) is referred to. Then, a comparison is made with a band of a current transmission line 80, and a data reduction amount is set that does not impair a real-time property but causes the precision of analysis to be maintained or be greater than or equal to a predetermined precision even if the data reduction amount is reduced.

Specifically, a maximum amount of information is set that can be considered to not impair the real-time property in the band of a current transmission line 80, and the precision of analysis of the analysis engine 90 is checked in the case of the amount of information.

If the precision of analysis is greater than or equal to a predetermined precision, the amount of information is determined as an amount of information after reduction processing.

In contrast, in the band of a current transmission line 80, in a case where a maximum amount of information that can be considered to not impair the real-time property causes the precision of analysis to become insufficient, various examples are conceivable.

For example, the analysis engine 90 is changed to cause the precision of analysis to become higher.

Alternatively, a low precision of analysis is allowed, and transmission is performed. However, in the generation described below of the setting information CLD, processing for reducing the evaluation value is performed.

Alternatively, it is also conceivable that the precision of analysis and the real-time property of a band are considered, and an amount of information is slightly increased such that the real-time property is sacrificed to a certain extent and the event extraction precision is considered more important.

After an amount of information, that is, an amount of information after reduction processing, has been set in step S105, the information processing apparatus 1 performs information amount reduction processing in step S106. Stated another way, for example, resolution conversion or frame thinning-out, or both of them are performed on the images signal PS1 in such a way that the amount of information that has been set is obtained.

Then, the processes of steps S107 and S108 are performed.

Note that, in this example, an amount of information to be reduced is set in step S105, but processing for reduction an amount of information by a fixed reduction amount may be performed.

Furthermore, regardless of a band state, information amount reduction processing may always be performed. For example, it is also conceivable that the time of transfer to the analysis engine 90 is reduced by reducing the data size of the image signal PS1 within a range that does not affect an analysis result in such a way that a resolution is about 1280×720.

As described above, as the first processing, the information processing apparatus 1 transmits the image signal PS2 to the analysis engine 90.

At this time, in some cases, an image for real-time processing fails to be appropriately communicated depending on the band of the transmission line 80 and an amount of information of the image signal PS2, namely, a frame rate and a resolution. Accordingly, an amount of information is reduced as needed.

Figure 7:
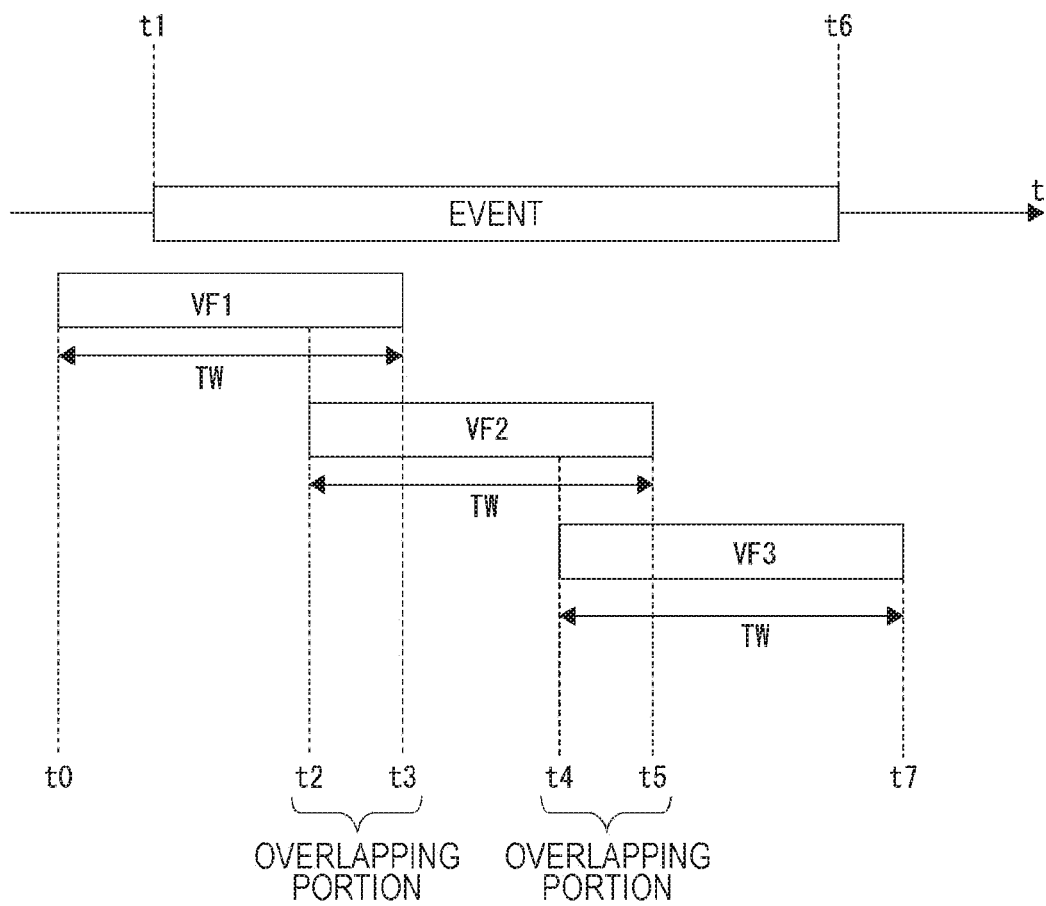
FIG. 7 is an explanatory diagram of partially overlapping in the transmission of image files according to the embodiment.

Note that, in encoding processing for transmission in step S107, it is desirable that the information processing apparatus 1 perform a change into a file, as illustrated in FIG. 7.

In FIG. 7, point in time t1 to point in time t6 are illustrated as a period during which a certain event occurs, and such an event needs to be accurately extracted by the analysis engine 90.

In a case where a file is transmitted in a state where the file has been divided into pieces of a short time, a side of the analysis engine 90 fails to accurately recognize a connection on a time axis in some cases. Accordingly, an image file serving as the image signal PS2 is caused to include an image file VF1 serving as a scene from point in time t0 to point in time t3, an image file VF2 serving as a scene from point in time t2 to point in time t5, and an image file VF3 serving as a scene from point in time t4 to point in time t7, as illustrated.

Each of the image files VF1, VF2, and VF3, as described above, has a time width TW, and a front or rear portion of each of the image files is provided with a portion (points in time t2 to t3 or points in time t4 to t5) that overlaps an image file of an adjacent period.

An image file is formed to include an overlapping portion of, for example, about 1 second, as described above, and the image file is transferred to the analysis engine 90. Therefore, an event that covers a plurality of image files is accurately extracted.

Note that it has been described above that each of the image files VF1, VF2, . . . has a fixed time width TW, but each of the image files VF1, VF2, . . . may have a time width having an unfixed length that includes a variable time width, rather than a fixed time width.

<4. Processing for Generating Clip Setting Information>

Next, an example of the second processing that the information processing apparatus 1 performs by using a function of the event analyzer 1A is described with reference to FIGS. 8 and 9. Stated another way, an example of processing is described in which the information processing apparatus 1 generates setting information CLD for the generation of a clip image CL, by using event extraction information EV received from the analysis engine 90.

In step S201, the information processing apparatus 1 receives event extraction information EV from the analysis engine 90.

The information processing apparatus 1 continuously performs the first processing of FIG. 6 described above while the imaging device 3 performs imaging (for example, during broadcasting), and the analysis engine 90 receives and analyzes an image signal PS2 in an almost real time.

At this time, the analysis engine 90 generates event extraction information EV in response to the extraction of an event, and transmits the event extraction information EV to the information processing apparatus 1 every time or at a timing at which some pieces of event extraction information EV have been collected. Accordingly, the reception of the event extraction information EV in step S201 is irregularly performed.

Upon receipt of the event extraction information EV, in step S202, the information processing apparatus 1 checks, with respect to one piece of event extraction information EV serving as a processing target, whether or not there is event extraction information EV for an image that has been captured by another imaging device 3 at the same timing as a timing of the one piece of event extraction information EV.

For example, each of the image signals PS1 captured by a plurality of imaging devices 3 is converted into an image signal PS2, and is transmitted to the analysis engine 90. For example, in a case where three imaging devices 3 have imaged a goal scene of soccer, there is a possibility that a scene of the same time zone is extracted as an event from each of the image signals PS2 captured by the respective imaging device 3. In step S202, whether or not a scene of the same target has been extracted as an event, as described above, is checked on the basis of time information of each piece of event extraction information EV, namely, an in-point and an out-point.

Figure 9:
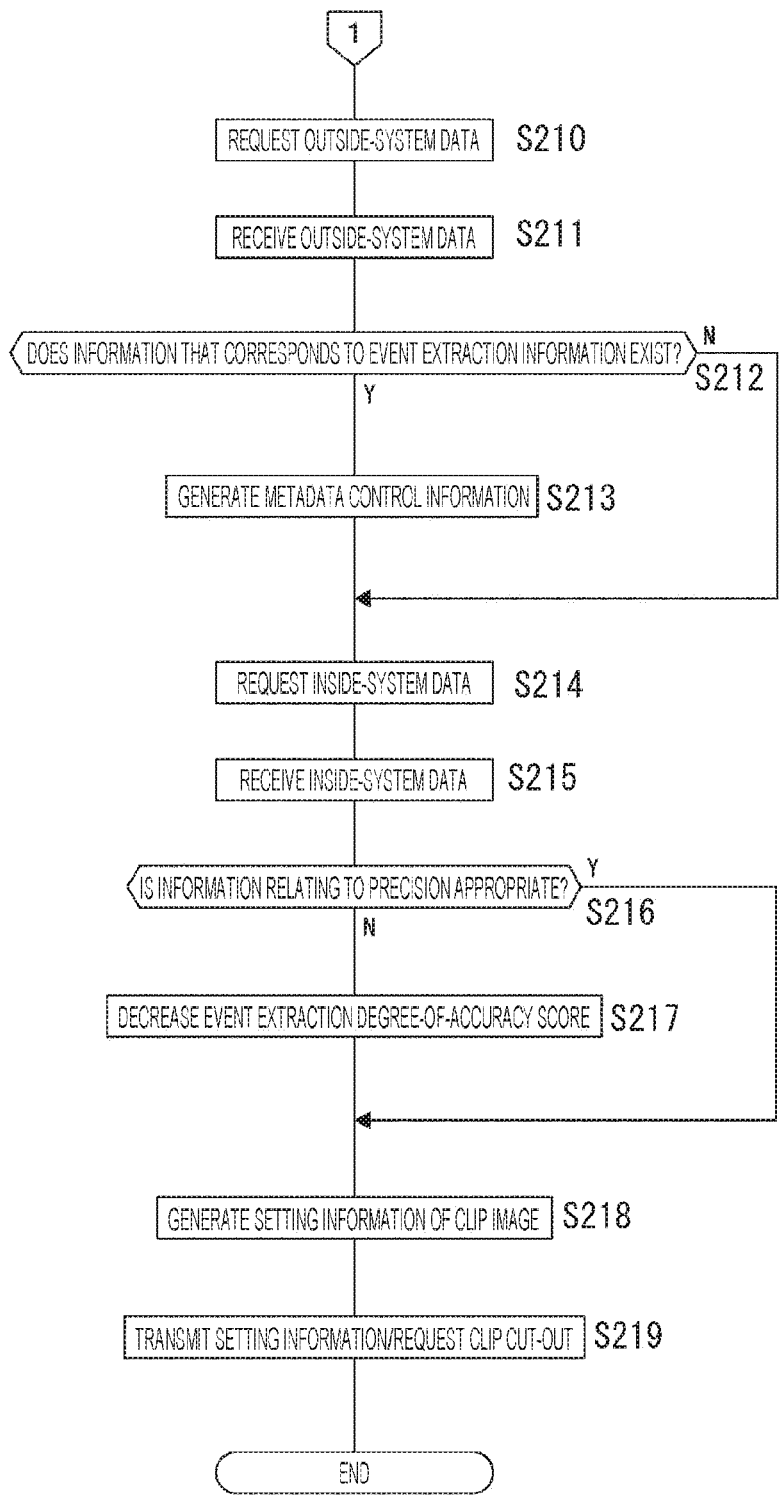
FIG. 9 is a flowchart of processing for generating clip setting information of the information processing apparatus according to the embodiment.

If there are no other pieces of event extraction information EV relating to the same event, the information processing apparatus 1 moves from step S203 to step S210 of FIG. 9.

In a case where the same important scene has been imaged by a plurality of imaging devices 3 and other cases, and in a case where there are plural pieces of event extraction information EV of the same time zone, the information processing apparatus 1 moves from step S203 to step S204, and calculates an imaging range of an image captured by another imaging device 3 from another corresponding piece of event extraction information EV. Stated another way, an in-point and an out-point are acquired for another piece of event extraction information EV that has been extracted as the same event.

Then, in step S205, the information processing apparatus 1 checks whether or not a range (an in-point to an out-point) of event extraction information EV serving as a processing target includes a range (an in-point to an out-point) of the other piece of event extraction information EV.

It is assumed, for example, that a time stamp of hour:minute:second:frame is as described below.

An in-point of event extraction information EV serving as a processing target is 00:05:31:10.

An out-point of the event extraction information EV serving as a processing target is 00:06:29:03.

In contrast, in "Example 1", if:

an in-point of another piece of event extraction information EV is 00:05:45:00; and an out-point of the other piece of event extraction information EV is 00:06:18:15, the entire range of the other piece of event extraction information EV is included in a range of the event extraction information EV serving as a processing target.

Accordingly, even if the in-point and the out-point of the event extraction information EV serving as a processing target are not changed, an image range of another imaging device is also included.

On the other hand, in "Example 2", if:

an in-point of another piece of event extraction information EV is 00:05:25:51; and an out-point of the other piece of event extraction information EV is 00:06:18:15, a range near the in-point of the other piece of event extraction information EV is not included in the range of the event extraction information EV serving as a processing target.

Furthermore, in "Example 3", if:

an in-point of another piece of event extraction information EV is 00:05:45:00; and an out-point of the other piece of event extraction information EV is 00:06:35:17, a range near the out-point of the other piece of event extraction information EV is not included in the range of the event extraction information EV serving as a processing target.

Needless to say, in some cases, both a range near the in-point and a range near the out-point are not included in the event extraction information EV serving as a processing target.

In these cases, the information processing apparatus 1 moves on to step S206, and changes the in-point and the out-point of the event extraction information EV serving as a processing target by using an in-point and an out-point of event extraction information EV that relates to another imaging device 3.

Stated another way, one of or both the in-point and the out-point of the event extraction information EV serving as a processing target are changed to include a range of another piece of event extraction information EV. For example, in the case of "Example 2" described above, processing is performed for changing the in-point to 00:05:25:51, and in the case of "Example 3", processing is performed for changing the out-point to 00:06:35:17.

In step S207, the information processing apparatus 1 increases a score indicating a degree of accuracy of event extraction for the event extraction information EV serving as a processing target. In this process, because a scene imaged by a plurality of imaging devices 3 has been extracted as an event, it is determined that an important scene has actually been extracted by the analysis engine 90 at a high degree of accuracy, and the score is increased.

In step S208, the information processing apparatus 1 checks whether or not there remains event extraction information EV in which the same event of the same time zone has been extracted and on which calculation has not yet been performed. If there remains the event extraction information EV, the information processing apparatus 1 returns to step S204, and performs similar processing by using another remaining piece of event extraction information EV.

In this case, similarly, in steps S205 and S206, the in-point and the out-point of the event extraction information EV serving as a processing target are checked or changed to include a range of the other piece of event extraction information EV.

Furthermore, by performing the process of step S207, the score is further increased. Stated another way, as a larger number of imaging devices 3 have imaged the same event, it is determined that a degree of accuracy of event extraction is higher.

When the information processing apparatus 1 moves on to step S210 of FIG. 9, the information processing apparatus 1 requests outside-system data from the outside-system equipment 81, and receives data from the outside-system equipment 81 in step S211.

Then, in step S212, the information processing apparatus 1 checks whether or not information that corresponds to the event extraction information EV serving as a processing target exists in the received outside-system data.

In a case where the information exists, the information processing apparatus 1 moves on to step S213, and performs processing for generating metadata control information that corresponds to a corresponding event.

In step S214, the information processing apparatus 1 requests inside-system data from equipment in the system 10, for example, the information device 3. Then, in step S215, the information processing apparatus 1 receives data inside the system 10 from equipment serving as a request destination.

For example, camera data at the time of imaging is acquired from an imaging device 3 that has captured an image that is a source of event extraction information EV serving as a current processing target. If a real-time property is sufficiently secured from imaging to the reception of event extraction information EV, camera data at a current point in time may be acquired.

In step S216, the information processing apparatus 1 determines whether or not a captured image is in an appropriate state, on the basis of the acquired camera data. For example, it is determined whether or not an imaging direction is appropriate, whether or not a focus state is appropriate, whether or not the brightness of an image is appropriate, or the like.

In a case where the captured image is not in an appropriate state, the processing moves on to step S217, and the score is decreased. In this case, it is determined that an image section that is not so appropriate has been extracted, and it is evaluated that a degree of accuracy of extraction is low.

In step S218, the information processing apparatus 1 generates setting information CLD in view of the processes described above.

An in-point and an out-point serving as a cutting-out range are set by using the in-point and the out-point of the event extraction information EV serving as a processing target or an in-point and an out-point that have been modified in step S206. In some cases, as setting information, EDL data, information relating to selection of rear-stage processing, or information for assisting the operator OP that is illustrated in FIG. 5 is included.

Further, the information processing apparatus 1 causes setting information CLD to also include the metadata control information generated in step S213. Furthermore, the information processing apparatus 1 causes setting information CLD to also include a score value of a degree of accuracy of event extraction that has been set in step S207 or S217.

Then, the information processing apparatus 1 transmits the setting information CLD to the recording device 2 in step S219, and makes a clip cutting-out request.

In response to this, the recording device 2 cuts out a clip image CL, adds metadata, or the like.

As described above, the information processing apparatus 1 generates setting information CLD on the basis of event extraction information EV acquired from the analysis engine 90, and gives the designation of an in-point and an out-point of cutting-out to the recording device 2.

Furthermore, the content of metadata MT, information relating to the score, or other assistance data is also provided.

In the processing described above, in a case where image signals PS1 from a plurality of imaging devices 3 are received as an input, the information processing apparatus 1 uses results of extracting an event from image signals PS2 captured by the plurality of imaging devices 3, and updates a degree of accuracy or a start time and an end time of the event.

Specifically, when the same object has been imaged in a plurality of camera videos or when the plurality of camera videos has an inclusion relationship, and when the same event has been detected at a similar timing, degrees of accuracy of respective detection results are changed to increase (S207).

With regard to an imaged object, the imaging of the same object can be calculated by using an orientation of an imaging device 3, a zoom value, or a focus value (S202).

Furthermore, a start time and an end time of an event is set to be a logical sum of all of the cameras (S206).

Furthermore, the information processing apparatus 1 receives, as an input, information relating to another piece of equipment in the system, such as camera data of an imaging device 3 that is used in analysis performed by an engine, in order to increase the precision of event extraction (S214 and S215).

Then, by using data of a focus value or an orientation of an imaging device 3, it is determined, for example, whether or not an image from the imaging device 3 is correctly in focus, and processing is performed for decreasing a score indicating a degree of accuracy with respect to an event that has been detected in a video that is out of focus, or the like (S217).

Note that, in a case where event extraction information EV from the analysis engine 90 includes information indicating a degree of accuracy of an extracted event, the information can also be reflected in the score.

Furthermore, the information processing apparatus 1 receives, as an input, measurement data (telemetry data) of another device that is used in an event or Internet information as outside-system data (S210 and S211). For example, a combination is made with externally published stats data of an event, and the stats data is registered as additional information, such as a point score or the name of a player that has made the point score, in event data including a timing of the stats data (S213).

In order to add metadata MT to a clip image CL, the information processing apparatus 1 generates metadata control information including an event name, a target object such as a person or a uniform number, a degree of accuracy, or the like that relates to the clip image CL, causes setting information CLD to include the metadata control information, and supplies these pieces of information to the recording device 2. The recording device 2 registers these pieces of information as metadata MT of the clip image CL.

By doing this, an operator OP in a rear stage can easily search for a clip, and an operation burden can be reduced.

Figure 10:
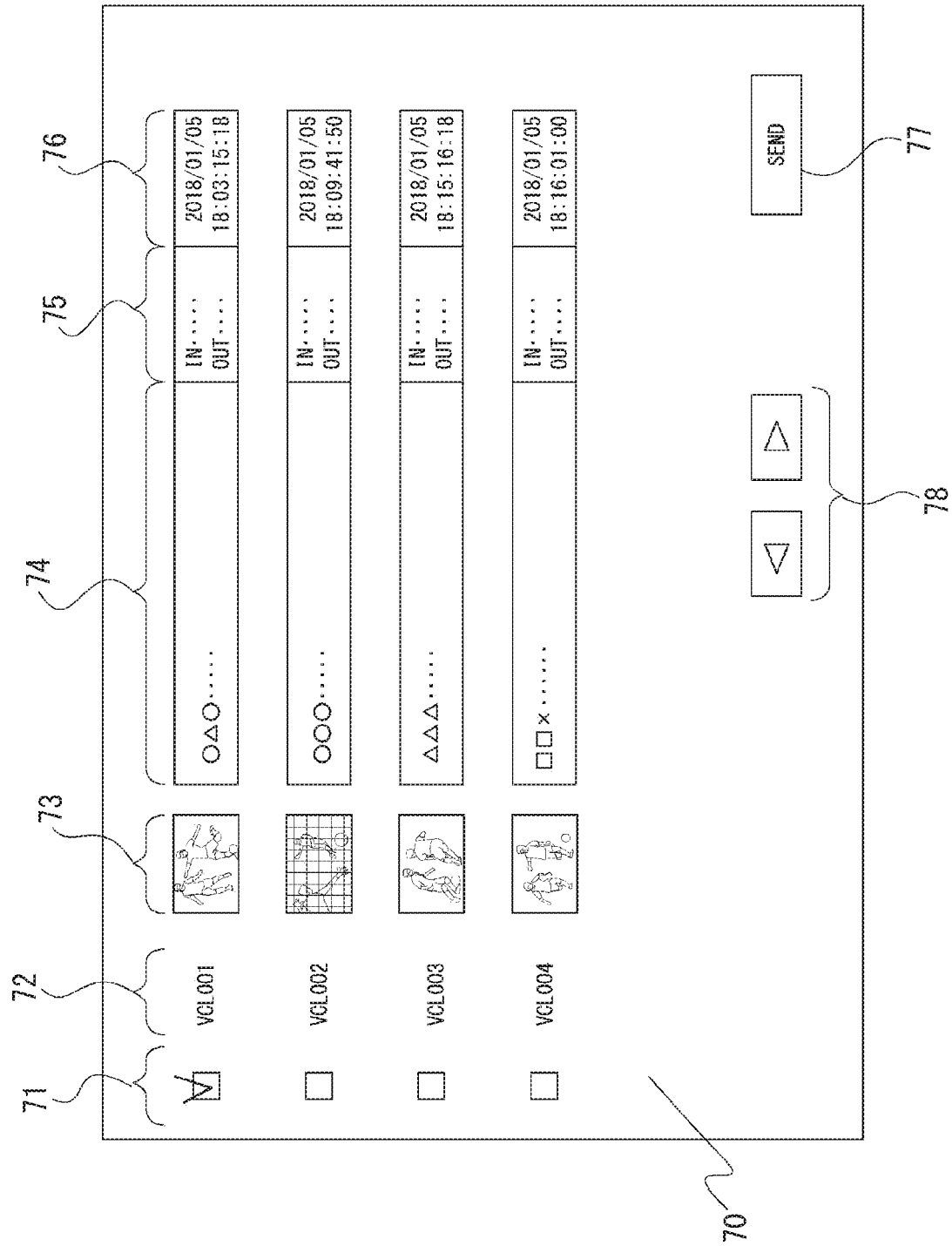
FIG. 10 is an explanatory diagram of a clip presentation screen according to the embodiment.

In a case where the recording device 2 has cut out the clip image CL on the basis of the setting information CLD, the operator OP can check a clip image CL that is currently being generated on a screen, as illustrated, for example, in FIG. 10.

For example, on this clip list screen 70, a check box 71, a file number 72 of a clip image file, a thumbnail image 73, various types of additional information 74, an in-point and an out-point 75, imaging time information 76, or the like is displayed to correspond to each clip image CL.

Furthermore, a page feeding button 78 for checking a large number of clips by feeding pages, a SEND button 77 for transmitting a selected clip to a rear-stage device, or the like is displayed.

For each of the clip images CL, a display based on metadata MT can be conducted, for example, as the additional information 74. Information for assisting the operator OP in clip selection, such as the name/type of a scene, the name of a player, or a score indicating a degree of accuracy of event extraction, is displayed as the additional information 74.

The clip list screen 70, as described above, enables an operator to select an arbitrary clip image CL. Needless to say, the content can be actually checked by reproducing a clip image CL itself.

The operator OP performs an operation to put a check in the check box 71 for a clip image CL to be selected, and operates the SEND button 77, and therefore a data file of the clip image CL is transmitted to a rear-stage device.

Note that, in order to further assist the operator OP, the information processing apparatus 1 can cause the setting information CLD to include proposal information (recommendation information). For example, a proposal for insertion at another camera angle based on a result of analyzing an image from another imaging device 3 is included. Alternatively, an operation performed in a past editing task is recognized from EDL data acquired by the feedback reception processing unit 1B, and a proposal to, for example, change the reproduction speed of a portion or another proposal is included. By displaying such recommendation information, for example, as the additional information 74, a selection operation of the operator OP can be facilitated. This enables a reduction in an editing operation burden imposed on the operator OP.

<5. Operation Using Feedback Information>

The information processing apparatus 1 according to the embodiment can also perform various types of processing using feedback information FBD, by using a function of the feedback reception processing unit 1B.

As described above, the information processing apparatus 1 acquires, as the feedback information FBD, clip selection information of the operator OP, the length of a clip that has been used, or the like.

Furthermore, the information processing apparatus 1 also acquires, as the feedback information FBD, EDL data indicating a history of an operation performed by the operator OP, such as a change in an in-point and an out-point of a clip or insertion of an image captured by another imaging device 3, for the clip that has been used.

Examples of various types of processing using these pieces of feedback information FBD are described below.

The information processing apparatus 1 can determine whether or not the operator OP has used, as a replay image or a highlight image, a clip image CL that has been generated by the recording device 2 on the basis of setting information CLD, and can provide feedback to setting information generation processing.

It is conceivable that a desirable clip length be determined from a clip image CL that has been used and an in-point and an out-point of setting information CLD in a later time are corrected.

Furthermore, a taste of the operator OP for a desirable highlight image can be learnt from a camera angle, a zoom state, or the like of a clip image CL that has been used, and such an image can be caused to be easily formed into a clip.

For example, the information processing apparatus 1 determines, in advance, a camera angle or a zoom state that is frequently used in a broadcast, on the basis of the feedback information FBD. Then, for example, in a case where three imaging devices 3 have extracted the same event, setting information CLD is generated in such a way that, from among images captured by the three imaging devices, an image having an angle or a zoom state that has frequently been used so far becomes a main image. By doing this, a clip image CL that is likely to be used can be automatically generated.

Furthermore, the information processing apparatus 1 can also perform automatic cutting-out editing that imitates an operation of the operator OP, by also acquiring information relating to the operator OP in addition to the length of a clip that has been used or the EDL data. For example, by collecting selected clip information, EDL data, or the like that serves as an operation history of an individual operator OP, a taste of the operator can be learnt. Accordingly, by reflecting a learning result in the setting information CLD, a clip image CL that the operator likes can be generated. Alternatively, a clip image CL that simulates an operation of the operator OP can also be generated.

Furthermore, recommendation information can also be provided for each operator.

The information processing apparatus 1 stores, in advance, the feedback information FBD for each individual operator OP. Then, a taste of an operator for clip selection is determined, and additional information or recommendation information that serves as metadata MT is added.

It is also conceivable, for example, that outside-system data is referred to and a similar scene is recommended.

In a case where a tendency of selection of the operator OP has been able to be learnt, a generated clip image CL can be given a priority order on the basis of a degree of matching the tendency, and can be presented to the operator OP.

The information processing apparatus 1 can control an operation of the imaging device 3.

The information processing apparatus 1 determines a tendency, such as a camera angle or a zoom state, of a clip image CL that is likely to be selected by the operator OP, on the basis of the feedback information FBD. A control signal CTR is generated in such a way that the camera angle or the zoom state is used, and an operation of the imaging device 3 is automatically controlled. By doing this, the quality/content of a clip image CL can be improved.

Furthermore, it is also conceivable that the information processing apparatus 1 acquires, from the analysis engine 90, a certain type of information indicating, for example, the detection of unclearness of an image of an image signal PS2, generates a control signal CTR for an imaging device 3, and controls a focus state, a brightness (an exposure value), or the like of the imaging device 3.

When an imaging operation of the imaging device 3 is optimized, as described above, the precision of analysis performed by the analysis engine 90 also increases, and this results in improvements in the precision of event extraction.

Note that the information processing apparatus 1 may only transmit the control signal CTR to the imaging device 3 without transmitting generated setting information CLD to the recording device 2, and may only automatically control an operation of the imaging device 3 without generating a clip image CL. Furthermore, a device that is automatically controlled is not limited to the imaging device 3, and any device may be automatically controlled if an image signal PS1 is analyzed and control is performed on the basis of event extraction information EV of the image signal PS1. Examples include automatic driving control of an automobile, and the like.

The information processing apparatus 1 may provide the feedback information FBD to the analysis engine 90. The analysis engine 90 is caused to learn a tendency of clip selection of the operator OP on the basis of the feedback information FBD, and extract an event that matches the tendency.

By doing this, the precision of event extraction information EV that is received by the information processing apparatus 1 can be improved.

Needless to say, the information processing apparatus 1 itself may perform learning processing using the feedback information FBD, and may reflect a result in the generation of setting information CLD.

For example, the information processing apparatus 1 learns an event, a scene, a camera angle, a zoom state, or the like that is likely to be used in a broadcast. For example, events are divided into clusters, and a tendency of selection is learnt for each of the clusters. Then, the tendency is reflected in setting information. For example, the tendency is reflected in setting of an in-point and an out-point, metadata, or recommendation data.

As feedback, camera data, such as zoom or panning/tilting, of the imaging device 3 may be acquired. A learning result using the camera data can be reflected in setting information CLD, or a priority order of presentation to the operator OP can also be set.

Furthermore, if the name of a cameraman, or the like is set in advance and a system is operated, and the information processing apparatus 1 acquires the camera data such as zoom or panning/tilting, a camera work that corresponds to an event can be associated. Then, by automatically controlling the imaging device 3 at the time of the occurrence of an event, a camera work that imitates the cameraman can be achieved.

<6. Example of Utilization in Endoscopic Surgery System>

The technology according to the present disclosure (the present technology) can be utilized in a variety of products. For example, the technology according to the present disclosure may be applied to an endoscopic surgery system.

Figure 11:
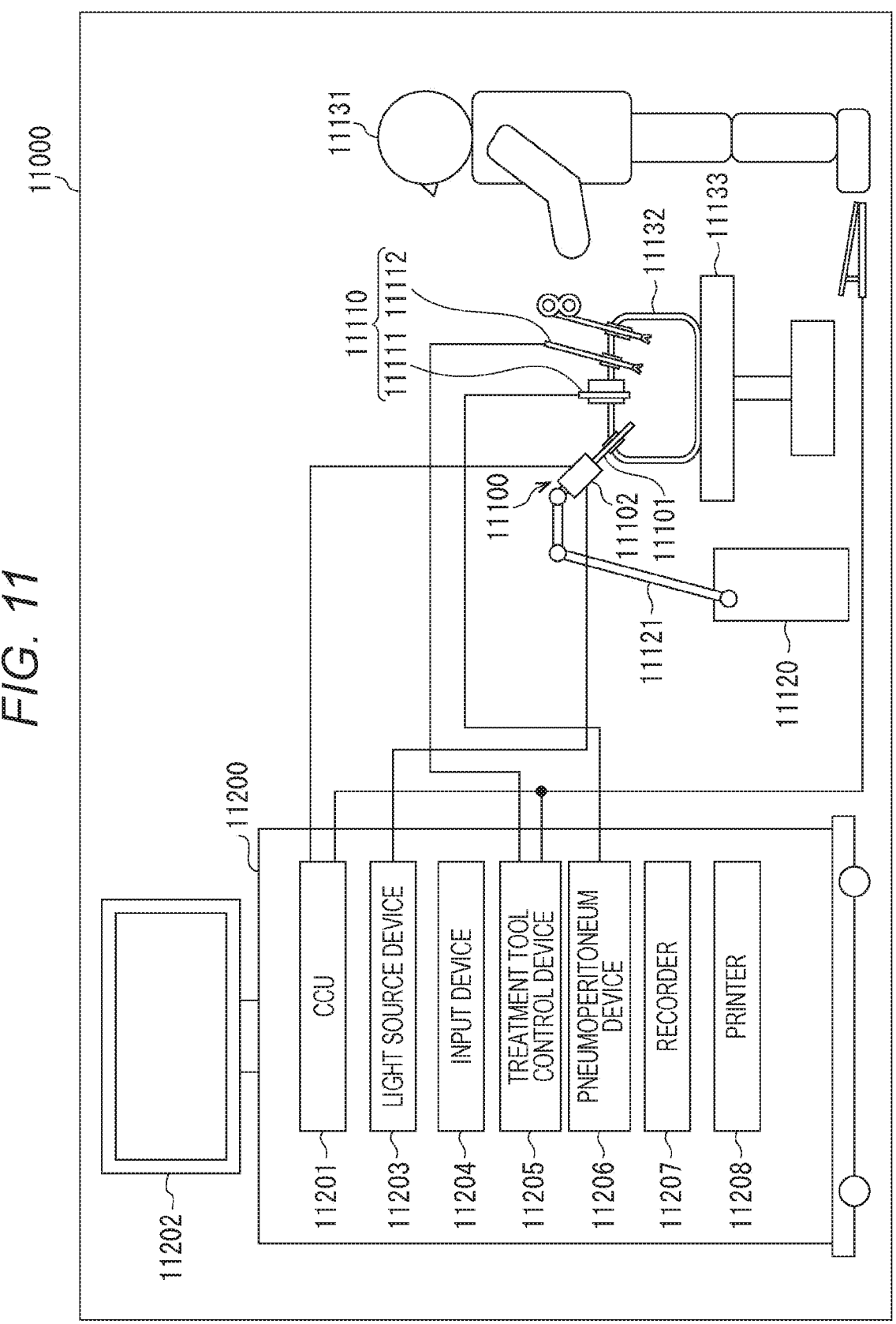
FIG. 11 is a diagram illustrating an example of a schematic configuration of an endoscopic surgery system.

FIG. 11 is a diagram illustrating an example of a schematic configuration of an endoscopic surgery system to which the technology according to the present disclosure (the present technology) can be applied.

FIG. 11 illustrates a state where a surgical operator (a surgeon) 11131 is performing surgery on a patient 11132 on a patient bed 11133, by using an endoscopic surgery system 11000. As illustrated, the endoscopic surgery system 11000 includes an endoscope 11100, another surgical instrument 11110 such as a pneumoperitoneum tube 11111 or an energy treatment tool 11112, a support arm device 11120 that supports the endoscope 11100, and a cart 11200 that is mounted with various devices for endoscopic surgery.

The endoscope 11100 includes a lens barrel 11101 in which an area having a predetermined length from a distal end is inserted into a body cavity of the patient 11132, and a camera head 11102 that is connected to a base end of the lens barrel 11101. The illustrated example indicates an endoscope 11100 that is configured as what is called a rigid scope including a rigid lens barrel 11101, but the endoscope 11100 may be configured as what is called a soft scope including a soft lens barrel.

At the distal end of the lens barrel 11101, an opening into which an objective is fitted is provided. The endoscope 11100 is connected to a light source device 11203, and light generated by the light source device 11203 is guided to the distal end of the lens barrel 11101 by a light guide that extends to the inside of the lens barrel, and is applied via the objective toward an observation target in the body cavity of the patient 11132. Note that the endoscope 11100 may be a forward-viewing endoscope, or may be an oblique-viewing endoscope or a side-viewing endoscope.

Inside the camera head 11102, an optical system and an imaging element are provided, and reflected light (observation light) from the observation target is condensed into the imaging element by the optical system. Optical-to-electrical conversion is performed on the observation light by the imaging element, and an electric signal that corresponds to the observation light, that is, an image signal that corresponds to an observation image, is generated. The image signal is transmitted as raw data to a camera control unit (CCU) 11201.

The CCU 11201 includes a central processing unit (CPU), a graphics processing unit (GPU), or the like, and integrally controls operations of the endoscope 11100 and a display device 11202. Moreover, the CCU 11201 receives the image signal from the camera head 11102, and performs, on the image signal, various types of image processing for displaying an image based on the image signal, such as development processing (demosaic processing).

Under the control of the CCU 11201, the display device 11202 displays an image based on the image signal on which image processing has been performed by the CCU 11201.

The light source device 11203 includes a light source such as a light-emitting diode (LED), and supplies the endoscope 11100 with irradiation light in imaging a surgical site or the like.

An input device 11204 is an input interface to the endoscopic surgery system 11000. A user can input various types of information or an instruction to the endoscopic surgery system 11000 via the input device 11204. For example, a user inputs an instruction to change imaging conditions (the type of irradiation light, magnification, a focal length, and the like) of the endoscope 11100, or the like.

A treatment-tool control device 11205 controls the drive of the energy treatment tool 11112 for cauterization of tissue, incision, sealing of a blood vessel, or the like. The pneumoperitoneum device 11206 feeds gas into the body cavity via the pneumoperitoneum tube 11111 in order to expand the body cavity of the patient 11132 for the purpose of securing a field of view of the endoscope 11100 and securing a working space of the surgical operator. A recorder 11207 is a device that can record various types of information relating to surgeon. A printer 11208 is a device that can print various types of information relating to surgeon in various forms such as text, an image, or a graph.

Note that the light source device 11203 that supplies the endoscope 11100 with irradiation light in imaging a surgical site can include a white light source that includes, for example, an LED, a laser light source, or a combination of the LED and the laser light source. In a case where a white light source includes a combination of RGB laser light sources, an output intensity and an output timing of each color (each wavelength) can be controlled with high precision, and therefore the white balance of a captured image can be adjusted in the light source device 11203. Furthermore, in this case, by irradiating an observation target with a laser beam from each of the RGB laser light sources in a time-division manner and controlling the drive of the imaging element of the camera head 11102 in synchronization with a timing of irradiation, an image that corresponds to each of RGB can be captured in a time-division manner. By employing this method, a color image can be obtained without providing a color filter in the imaging element.

Furthermore, the drive of the light source device 11203 may be controlled to change the intensity of output light every predetermined time period. By controlling the drive of the imaging element of the camera head 11102 in synchronization with a timing of a change in the intensity of light, acquiring images in a time-division manner, and combining the images, an image in a high dynamic range without what are called blocked-up shadows and blown-out highlights can be generated.

Furthermore, the light source device 11203 may be configured to be able to supply light in a predetermined wavelength band that corresponds to special light observation. In special light observation, by applying light in a band that is narrower than a band of irradiation light in normal observation (namely, white light) by using, for example, the wavelength dependency of absorption of light in body tissue, what is called narrow band imaging is performed in which a predetermined tissue such as a blood vessel of a mucous membrane surface layer is imaged with high contrast. Alternatively, in special light observation, fluorescence observation may be performed in which an image is obtained by using fluorescence that is generated due to irradiation with excitation light. In fluorescence observation, for example, fluorescence from the body tissue can be observed by irradiating body tissue with excitation light (autofluorescence observation), or a fluorescent image can be obtained by injecting a reagent of indocyanine green (ICG) or the like into body tissue and irradiating the body tissue with excitation light that corresponds to a fluorescent wavelength of the reagent. The light source device 11203 can be configured to be able to supply narrow-band light and/or excitation light that correspond to such special light observation.

Figure 12:
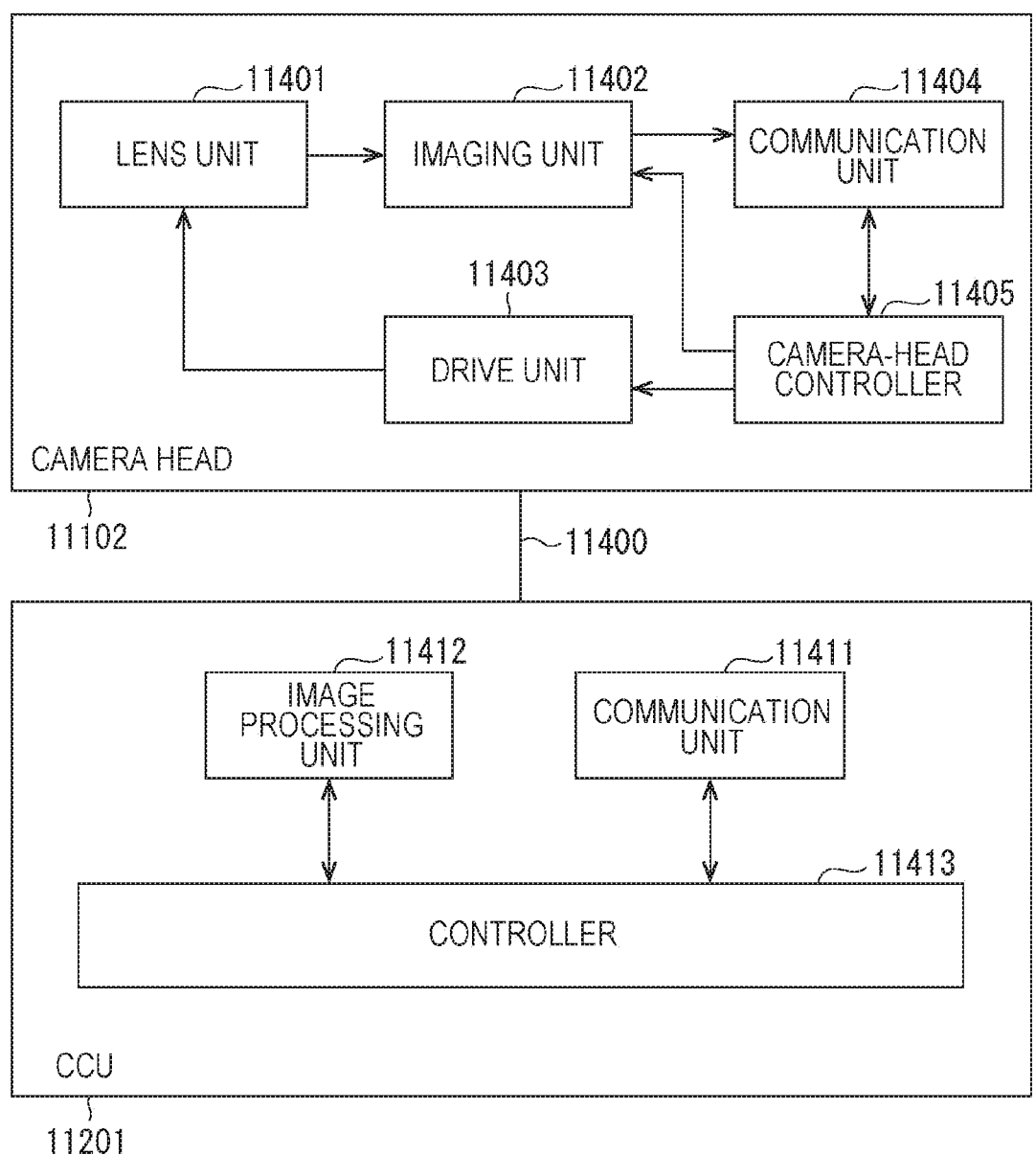
FIG. 12 is a block diagram illustrating an example of functional configurations of a camera head and a CCU.

FIG. 12 is a block diagram illustrating an example of functional configurations of the camera head 11102 and the CCU 11201 that are illustrated in FIG. 11.

The camera head 11102 includes a lens unit 11401, an imaging unit 11402, a drive unit 11403, a communication unit 11404, and a camera-head controller 11405. The CCU 11201 includes a communication unit 11411, an image processing unit 11412, and a controller 11413. The camera head 11102 and the CCU 11201 are communicably connected to each other by a transmission cable 11400.

The lens unit 11401 is an optical system that is provided in a connecting part with the lens barrel 11101. Observation light that has been taken in from the distal end of the lens barrel 11101 is guided to the camera head 11102, and enters the lens unit 11401. The lens unit 11401 includes a combination of a plurality of lenses including a zoom lens and a focus lens.

One imaging element may configure the imaging unit 11402 (what is called a single plate type), or a plurality of imaging elements may configure the imaging unit 11402 (what is called a multiplate type). In a case where the imaging unit 11402 is configured in a multiplate type, for example, a color image may be obtained by generating image signals that respectively correspond to RGB by using respective imaging elements and combining the image signals. Alternatively, the imaging unit 11402 may include a pair of imaging elements that respectively acquire image signals for the right eye and the left eye that correspond to a three-dimensional (3D) display. By conducting a 3D display, the surgical operator 11131 can more accurately grasp the depth of biotissue in the surgical site. Note that, in a case where the imaging unit 11402 is configured in a multiplate type, a plurality of lens units 11401 can also be provided that correspond to respective imaging elements.

Furthermore, the imaging unit 11402 does not always need to be provided in the camera head 11102. For example, the imaging unit 11402 may be provided immediately after an objective inside the lens barrel 11101.

The drive unit 11403 includes an actuator, and moves the zoom lens and the focus lens of the lens unit 11401 by a predetermined length along an optical axis under the control of a camera-head controller 11405. By doing this, a magnitude and a focus of an image captured by the imaging unit 11402 can be appropriately adjusted.

The communication unit 11404 includes a communication device that transmits or receives various types of information to or from the CCU 11201. The communication unit 11404 transmits the image signal acquired from the imaging unit 11402 as raw data to the CCU 11201 via the transmission cable 11400.

Furthermore, the communication unit 11404 receives, from the CCU 11201, a control signal for controlling the drive of the camera head 11102, and supplies the control signal to the camera-head controller 11405. The control signal includes information relating to imaging conditions, for example, information indicating that a frame rate of a captured image will be designated, information indicating that an exposure value in imaging will be designated, information indicating that magnification and a focus of the captured image will be designated, and/or other information.

Note that the imaging conditions described above, such as a frame rate, an exposure value, magnification, or a focus, may be appropriately designated by a user, or may be automatically set on the basis of an acquired image signal by the controller 11413 of the CCU 11201. In the latter case, what are called an auto exposure (AE) function, an auto focus (AF) function, and an auto white balance (AWB) function are mounted in the endoscope 11100.

The camera-head controller 11405 controls the drive of the camera head 11102 on the basis of the control signal that has been received from the CCU 11201 via the communication unit 11404.

The communication unit 11411 includes a communication device that transmits or receives various types of information to or from the camera head 11102. The communication unit 11411 receives an image signal that has been transmitted from the camera head 11102 via the transmission cable 11400.

Furthermore, the communication unit 11411 transmits, to the camera head 11102, a control signal for controlling the drive of the camera head 11102. The image signal or the control signal can be transmitted in telecommunication, optical communication, or the like.

The image processing unit 11412 performs various types of image processing on an image signal that has been transmitted from the camera head 11102 and serves as raw data.

The controller 11413 performs various types of control relating to the imaging of a surgical site or the like by using the endoscope 11100 and a display of a captured image obtained in the imaging of the surgical site or the like. For example, the controller 11413 generates a control signal for controlling the drive of the camera head 11102.

Furthermore, the controller 11413 causes the display device 11202 to display a captured image indicating the surgical site or the like, on the basis of an image signal on which image processing has been performed by the image processing unit 11412. At this time, the controller 11413 may recognize various objects in the captured image by using various types of image recognition technology. For example, the controller 11413 can recognize a surgical instrument such as a forceps, a specified region of a living body, bleeding, mist in the use of the energy treatment tool 11112, or the like by detecting the shape of an edge, color, or the like of an object included in the captured image. When the controller 11413 causes the display device 11202 to display a captured image, the controller 11413 may cause a display to be conducted in such a way that various types of surgery assistance information are superimposed onto an image indicating the surgical site, by using a result of recognition. By superimposing and displaying surgery assistance information and presenting the surgery assistance information to the surgical operator 11131, a burden imposed on the surgical operator 11131 can be reduced, and the surgical operator 11131 can reliably advance surgery.

The transmission cable 11400 that connects the camera head 11102 and the CCU 11201 is an electric signal cable that corresponds to communication of electric signals, an optical fiber that corresponds to optical communication, or a composite cable of the electric signal cable and the optical fiber.

Here, in the illustrated example, communication is performed by wire by using the transmission cable 11400, but communication between the camera head 11102 and the CCU 11201 may be performed wirelessly.

An example of an endoscopic surgery system to which the technology according to the present disclosure can be applied has been described above. The technology according to the present disclosure can be applied to the controller 11413 in the configuration described above.

When surgery is being performed, bleeding or perforation occurs in some cases. If surgery proceeds without noticing this state, a mortal wound is generated in some cases. Therefore, the controller 11413 transmits, to the analysis engine, a captured image acquired by the endoscope 11100 that is performing imaging in real time as an image signal for real-time processing, the analysis engine detects color or the like in the captured image to determine bleeding or the like as an event, and therefore the controller 11413 receives event extraction information of the event, and a replay image is presented to the surgical operator 11131 by using the event extraction information. This enables the surgical operator to immediately grasp a situation and reliably advance surgery.

Note that the endoscopic surgery system has been described as an example here, but the technology according to the present disclosure may also be applied to, for example, a microscopic surgery system and the like.

<7. Example of Utilization in Moving Body>

Furthermore, the technology according to the present disclosure (the present technology) may be implemented, for example, as an apparatus that is mounted in any type of moving body such as an automobile, an electric automobile, a hybrid electric automobile, a motorcycle, a bicycle, a personal mobility, an airplane, a drone, a ship, or a robot.

Figure 13:
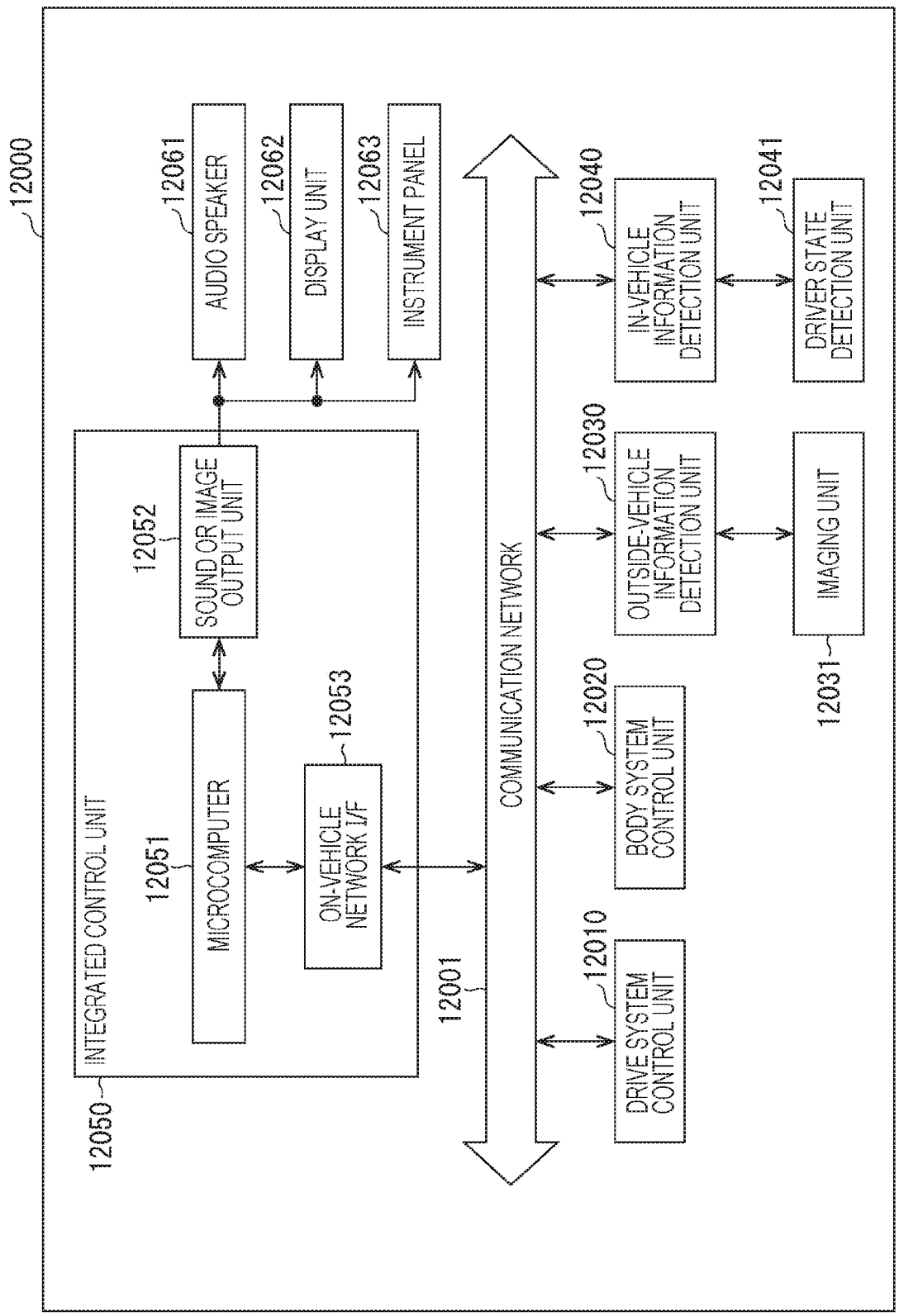
FIG. 13 is a block diagram illustrating an example of a schematic configuration of a vehicle control system.

FIG. 13 is a block diagram illustrating a schematic configuration example of a vehicle control system that is one example of a moving body control system to which the technology according to the present disclosure can be applied.

A vehicle control system 12000 includes a plurality of electronic control units that is connected via a communication network 12001. In the example illustrated in FIG. 13, the vehicle control system 12000 includes a drive system control unit 12010, a body system control unit 12020, an outside-vehicle information detection unit 12030, an in-vehicle information detection unit 12040, and an integrated control unit 12050. Furthermore, as a functional configuration of the integrated control unit 12050, a microcomputer 12051, a sound or image output unit 12052, and an on-vehicle network interface (I/F) 12053 are illustrated.

The drive system control unit 12010 controls an operation of a device that relates to a drive system of a vehicle in accordance with various programs. For example, the drive system control unit 12010 functions as a control device of a drive force generation device that generates a drive force of a vehicle, such as an internal combustion engine or a drive motor, a drive force transmission mechanism that transmits the drive force to wheels, a steering mechanism that adjusts a steering angle of the vehicle, a braking device that generates a braking force of the vehicle, and the like.

The body system control unit 12020 controls the operations of various devices equipped in a vehicle body in accordance with various programs. For example, the body system control unit 12020 functions as a control device of a keyless entry system, a smart key system, a power window device, or various lamps such as a headlamp, a back lamp, a brake lamp, a turn signal, or a fog lamp. In this case, radio waves transmitted from a portable machine that is substituted for a key or signals of various switches can be input to the body system control unit 12020. The body system control unit 12020 receives an input of these radio waves or signals, and controls a door locking device, the power window device, a lamp, or the like of the vehicle.

The outside-vehicle information detection unit 12030 detects information relating to the outside of a vehicle in which the vehicle control system 12000 is mounted. For example, the outside-vehicle information detection unit 12030 is connected to an imaging unit 12031. The outside-vehicle information detection unit 12030 causes the imaging unit 12031 to capture an image of the outside of the vehicle, and receives the captured image. The outside-vehicle information detection unit 12030 may perform object detection processing or distance detection processing on a person, a car, an obstacle, a traffic sign, characters on a road surface, or the like on the basis of the received image.

The imaging unit 12031 is an optical sensor that receives light and outputs an electric signal that corresponds to an amount of received light of the light. The imaging unit 12031 can output the electric signal as an image, or can output the electric signal as information of ranging. Furthermore, light received by the imaging unit 12031 may be visible light, or may be invisible light such as infrared light.

The in-vehicle information detection unit 12040 detects in-vehicle information. The in-vehicle information detection unit 12040 is connected, for example, to a driver state detector 12041 that detects a state of a driver. The driver state detector 12041 includes a camera that images, for example, a driver, and the in-vehicle information detection unit 12040 may calculate a fatigue degree or a concentration degree of the driver or may determine whether or not the driver is dozing on the basis of detection information input from the driver state detector 12041.

The microcomputer 12051 can calculate a control target value of the drive force generation device, the steering mechanism, or the braking device on the basis of in-vehicle or outside-vehicle information acquired by the outside-vehicle information detection unit 12030 or the in-vehicle information detection unit 12040, and can output a control command to the drive system control unit 12010. For example, the microcomputer 12051 can perform cooperative control aiming at implementing a function of an advanced driver assistance system (ADAS) including vehicle collision avoidance or impact mitigation, follow-up traveling based on a distance between vehicles, vehicle speed maintaining traveling, vehicle collision warning, vehicle lane departure warning, or the like.

Furthermore, the microcomputer 12051 can perform cooperative control aiming at automatic driving or the like for autonomously traveling independently of a driver's operation, by controlling the drive force generation device, the steering mechanism, the braking device, or the like on the basis of information relating to the periphery of the vehicle that has been acquired by the outside-vehicle information detection unit 12030 or the in-vehicle information detection unit 12040.

Furthermore, the microcomputer 12051 can output a control command to the body system control unit 12030 on the basis of outside-vehicle information acquired by the outside-vehicle information detection unit 12030. For example, the microcomputer 12051 can control a headlamp in accordance with a position of a preceding vehicle or an oncoming vehicle that has been sensed by the outside-vehicle information detection unit 12030, and can perform cooperative control aiming at antiglare, such as switching a high beam to a low beam.

The sound or image output unit 12052 transmits an output signal of at least one of sound or an image to an output device that can visually or aurally report information to a passenger of a vehicle or the outside of the vehicle. In the example of FIG. 13, an audio speaker 12061, a display unit 12062, and an instrument panel 12063 are illustrated as the output device. The display unit 12062 may include, for example, at least one of an on-board display or a head-up display.

Figure 14:
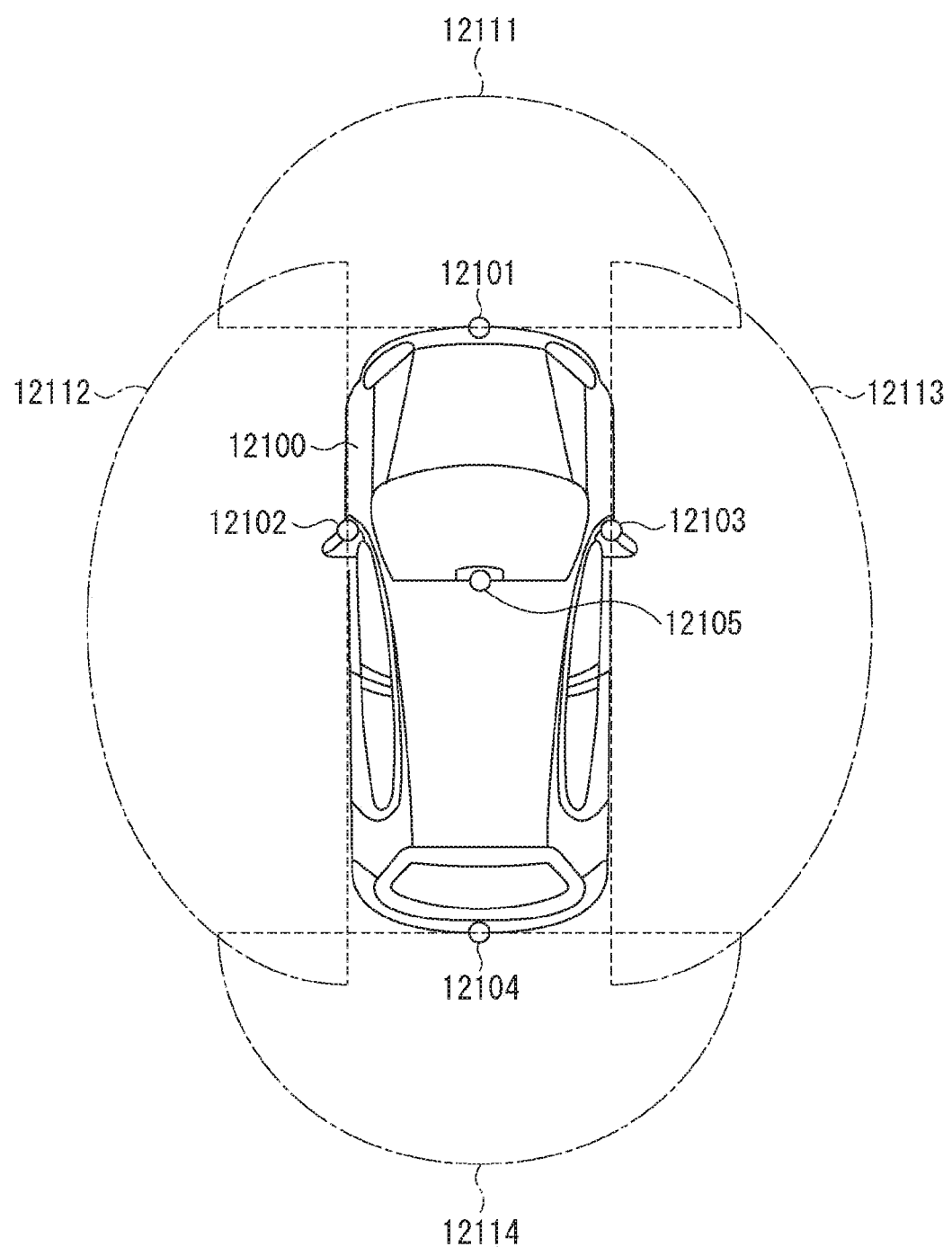
FIG. 14 is an explanatory diagram illustrating an example of the installation positions of an outside-vehicle information detector and an imaging unit.

FIG. 14 is a diagram illustrating an example of an installation position of the imaging unit 12031.

FIG. 14 illustrates imaging units 12101, 12102, 12103, 12104, and 12105 as the imaging unit 12031.

The imaging units 12101, 12102, 12103, 12104, and 12105 are provided in positions, for example, a front nose, a side-view mirror, a rear bumper, a back door, an upper portion of a windshield in a vehicle cabin, and the like of a vehicle 12100. The imaging unit 12101 included in the front nose and the imaging unit 12105 included in the upper portion of the windshield in the vehicle cabin principally acquire an image of a front side of the vehicle 12100. The imaging units 12102 and 12103 included in the side-view mirrors principally acquire images of sides of the vehicle 12100. The imaging unit 12104 included in the rear bumper or the back door principally acquires an image of a rear side of the vehicle 12100. The imaging unit 12105 included in the upper portion of the windshield in the vehicle cabin is principally used to detect a preceding vehicle, a pedestrian, an obstacle, a traffic light, a traffic sign, a traffic lane, or the like.

Note that FIG. 14 illustrates examples of imaging ranges of the imaging units 12101 to 12104. An imaging range 12111 indicates an imaging range of the imaging unit 12101 provided in the front nose, imaging ranges 12112 and 12113 respectively indicate imaging ranges of the imaging units 12102 and 12103 provided in the side-view mirrors, and an imaging range 12114 indicates an imaging range of the imaging unit 12104 provided in the rear bumper or the back door. For example, an overhead image in which the vehicle 12100 is viewed from the above is obtained by superimposing pieces of image data that have been captured by the imaging units 12101 to 12104 onto each other.

At least one of the imaging units 12101 to 12104 may have a function of acquiring distance information. For example, at least one of the imaging units 12101 to 12104 may be a stereo camera including a plurality of imaging elements, or may be an imaging element including pixels for the detection of a phase difference.

For example, the microcomputer 12051 can extract, in particular, a three-dimensional object that is located closest on an advancing route of the vehicle 12100 and travels at a predetermined speed (for example, 0 km/h or more) in almost the same direction as a direction of the vehicle 12100 to be a preceding vehicle, by obtaining a distance to each three-dimensional object in the imaging ranges 12111 to 12114 and a temporal change in this distance (a relative speed with respect to the vehicle 12100) on the basis of distance information acquired from the imaging units 12101 to 12104. Moreover, the microcomputer 12051 can set, in advance, a distance between vehicles to be secured in front of a preceding vehicle, and can perform automatic braking control (including follow-up stop control), automatic acceleration control (including follow-up starting control), and the like. As described above, cooperative control can be performed that aims at automatic driving or the like for autonomously traveling without depending on an operation performed by a driver.

For example, the microcomputer 12051 can classify pieces of three-dimensional data relating to three-dimensional objects into a motorcycle, an ordinary vehicle, a large vehicle, a pedestrian, and another three-dimensional object such as a telegraph pole on the basis of the distance information acquired from the imaging units 12101 to 12104 to extract the pieces of three-dimensional data, and can use the pieces of three-dimensional data to automatically avoid an obstacle. For example, the microcomputer 12051 identifies obstacles around the vehicle 12100 to divide the obstacles into obstacles that a driver of the vehicle 12100 can visually recognize and obstacles that are difficult to visually recognize. Then, the microcomputer 12051 determines a collision risk indicating a risk degree of collision against each of the obstacles. In a situation where the collision risk is greater than or equal to a setting value and there is a possibility of collision, the microcomputer 12051 outputs an alarm to the driver via the audio speaker 12061 or the display unit 12062, or performs forced deceleration or avoidance steering via the drive system control unit 12010, and this enables driving assistance for collision avoidance.

At least one of the imaging units 12101 to 12104 may be an infrared camera that detects infrared rays. For example, the microcomputer 12051 can recognize a pedestrian by determining whether or not the pedestrian is present in images captured by the imaging units 12101 to 12104. Such recognition of a pedestrian is performed in a procedure of extracting a feature point in images captured by the imaging units 12101 to 12104 serving as, for example, infrared cameras and a procedure of performing pattern matching processing on consecutive feature points indicating the contour of an object and determining whether or not the consecutive feature points are a pedestrian. When the microcomputer 12051 determines that a pedestrian is present in the images captured by the imaging units 12101 to 12104, and recognizes the pedestrian, the sound or image output unit 12052 controls the display unit 12062 in such a way that a rectangular contour line for emphasis is displayed to be superimposed onto the recognized pedestrian. Furthermore, the sound or image output unit 12052 may cause the display unit 12062 to display an icon or the like that indicates the pedestrian, in a desired position.

An example of a vehicle control system to which the technology according to the present disclosure can be applied has been described above. The technology according to the present disclosure can be applied to the microcomputer 12051 in the configuration described above.

In order to perform control aiming at automatic driving, control is performed on the basis of information acquired in imaging in real time. The microcomputer 12051 transmits, to the analysis engine, imaging information acquired from the imaging units 12101 to 12104 as an image signal for real-time processing, and the analysis engine analyzes a distance to each three-dimensional object or a temporal change in the imaging ranges 12111 to 12114. The analysis engine determines a risk of collision against each three-dimensional object to be an event on the basis of these analysis results, and transmits event extraction information of the event to the microcomputer 12051. The microcomputer 12051 uses the event extraction information, and outputs an alarm to a driver via the audio speaker 12061 or the display unit 12062 or performs forced deceleration or avoidance steering via the drive system control unit 12010, in a situation where there is a possibility of collision. This enables driving assistance for collision avoidance. Furthermore, by accumulating information relating to a case where a driver has performed a different operation in response to driving assistance or other information as feedback information in the analysis engine or the microcomputer 12051, it is determined whether or not control using the event extraction information has been correct, and event extraction or an analysis algorithm using the event extraction information is changed every time. This enables the precision of driving assistance to be improved.

<8. Summary and Variations>

According to the present embodiment described above, the following effects can be exhibited.

The information processing apparatus 1 according to the embodiment includes the event analyzer 1A that performs first processing for converting a received image signal PS1 into an image signal PS2 for real-time processing and transmitting the image signal PS2 to an analysis engine 90 that is located outside, and second processing for receiving event extraction information EV that has been received from the analysis engine 90 and generating setting information CLD of a clip image CL, by using the event extraction information EV.

By the information processing apparatus 1 performing the first processing and the second processing described above, a clip image serving as a replay image or an image for highlighting can be automatically cut out, and improvements in the efficiency of operation, manpower saving, or a reduction in a cost can be promoted.

For example, in the case of a sports broadcast or the like, in order to broadcast a replay or a highlight scene for an image (a moving image video) that has been captured in real time, an event in the image is extracted and is formed into a clip in a short time during broadcasting. If this is performed by an operator checking a recorded moving image and determining a range (an in-point and an out-point) of an image to be formed into a clip for an important scene, a task of extracting the image is not simple, and rapidity is requested. Therefore, an extremely large task burden is imposed on a staff. In the case of the embodiment, a great effect can be exhibited in which such a task that depends on manpower can be eliminated and an appropriate clip can be extracted.

Furthermore, the event extraction information EV from the external analysis engine 90 is not used as the setting information CLD for cutting out a clip image CL with no change. Stated another way, an event extraction result of the analysis engine 90 is modified, for example. By doing this, the precision of cutting out an image can be improved without depending on the performance of the analysis engine 90.

In the first processing, the information processing apparatus 1 (the event analyzer 1A) according to the embodiment has determined whether or not information amount reduction processing will be performed on the image signal, by using an amount of information of the image signal PS1 (PS2) and band information of the transmission line 80 for transmission to the analysis engine 90 (see S102 to S104 in FIG. 6).

For example, there is a possibility of impairing a real-time property depending on an amount of information that is specified by a frame rate or a resolution of an image signal serving as a real-time moving image and a circumstance of a band of a transmission line. In the present embodiment, a comparison is made between a reduction in an amount of information of an image signal and band information of a transmission line for transmission to the analysis engine, and it is determined whether or not information amount reduction processing (S106) will need to be performed on the image signal.

In a case where information amount reduction processing needs to be performed, information amount reduction processing is performed, and a real-time property can be maintained regardless of a band.

In the case of a sufficient band, it is sufficient if information amount reduction processing is not performed and the image information PS2 having a high frame rate and a high resolution is transmitted to the analysis engine 90, and a processing load of information amount reduction processing is not applied to the information processing apparatus 1. Furthermore, on a side of the analysis engine 90, image information having a large amount of information is acquired, and event analysis can be performed with high precision.

In information amount reduction processing, the information processing apparatus 1 (the event analyzer 1A) according to the embodiment has determined an amount of information after reduction, by using the band information and information relating to the precision of the analysis engine 90 that corresponds to the amount of information of the image signal PS1 (PS2) (S105).

In a case where an amount of information is reduced, information relating to the precision of the analysis engine with respect to an amount of information of an image signal is referred to, a degree of reduction processing is determined in consideration of this information and band information of a transmission line, and this enables reduction processing that causes a largest amount of information within a range in which a real-time property can be maintained. Moreover, a situation of a band of the transmission line can be coped within a state where an amount of information that does not interfere with analysis in the analysis engine is maintained.

By doing this, the quality of information in the analysis engine can be maintained, and as a result, a high-precision clip image can be automatically set.

In the embodiment, an example has been described where, in the first processing, the information processing apparatus 1 (the event analyzer 1A) performs processing for encoding an image signal PS1 received from the recording device 2 into a streaming image signal and transmitting the streaming image signal to the analysis engine 90.

By doing this, in a case where an analysis engine 90 is used that performs event extraction in accordance with a streaming image signal, an image signal PS2 can be transmitted without impairing a real-time property.

In the embodiment, an example has been described where, in the first processing, the information processing apparatus 1 (the event analyzer 1A) performs processing for dividing the image signal PS1 received from the recording device 2 into image periods having a fixed or unfixed time length, forming image files, and transmitting the image files to the analysis engine.

For example, an image signal serving as a real-time moving image is encoded into image files each including a scene of a period of about 5 to 10 seconds, and the image files are sequentially transmitted to the analysis engine.

By doing this, an analysis engine 90 can be used that performs event extraction in accordance with an image signal that has been formed into a file indicating an image having a length of a short period, and an image signal PS2 can be provided without impairing a real-time property.

In this case, an example has been described where the information processing apparatus 1 (the event analyzer 1A) generates the image files in such a way that front and rear image files that are temporally continuous include an overlapping partial scene (see FIG. 7).

For example, in image files of a period of about 5 to 10 seconds, front and rear images are caused to include an overlapping scene of, for example, about one second.

In a case where each image of a short time period is formed into a file, it is likely that connection between front and rear files becomes unclear in image analysis. However, by causing scenes to partially overlap each other, as described in the embodiment, the analysis engine 90 can easily and accurately recognize an event that covers a plurality of image files.

Figure 8:
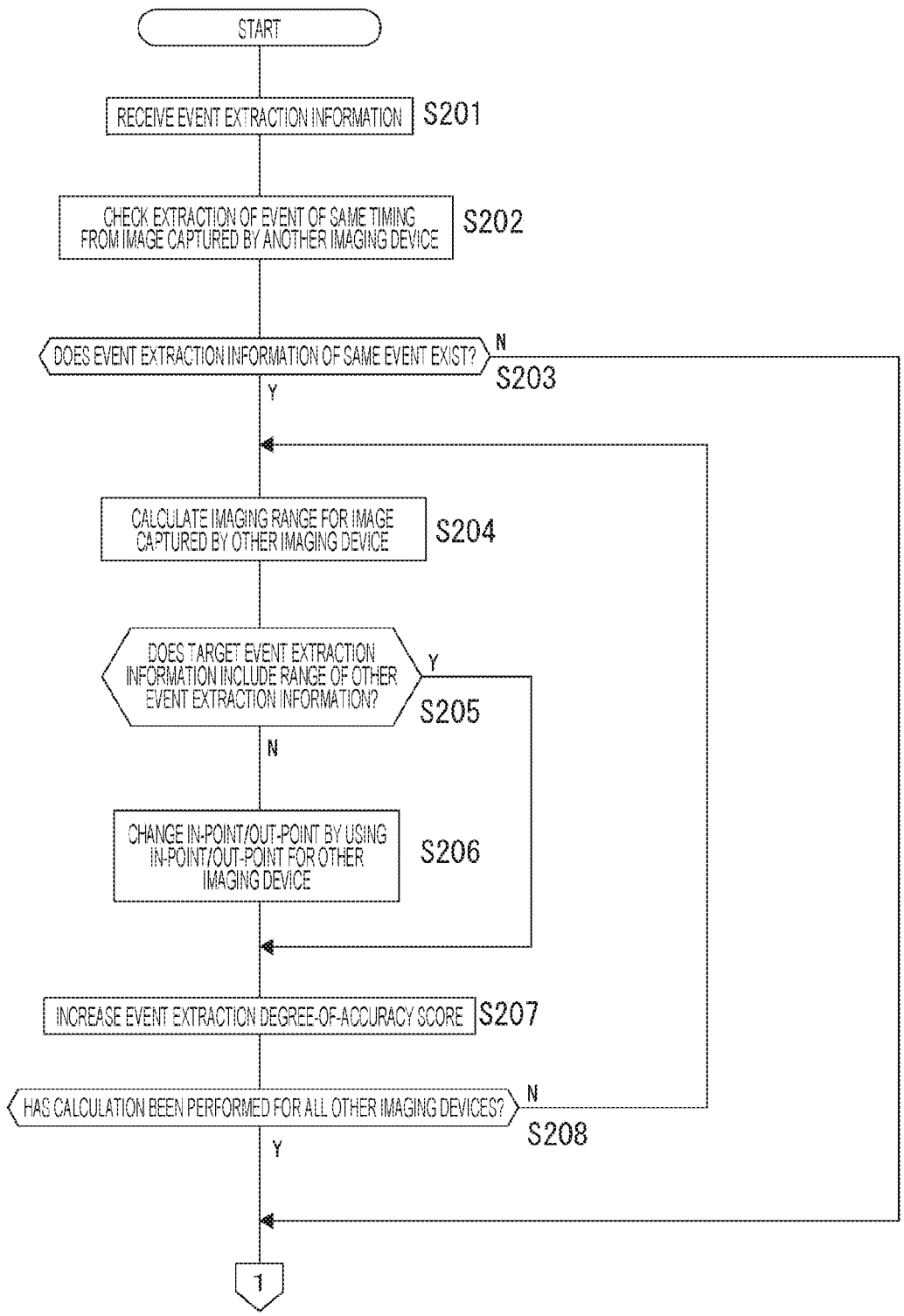
FIG. 8 is a flowchart of processing for generating clip setting information of the information processing apparatus according to the embodiment.

In the embodiment, an example has been described where, in the second processing, the information processing apparatus 1 (the event analyzer 1A) generates setting information CLD obtained by updating an in-point or an out-point of the event extraction information EV that has been received from the analysis engine 90, the event extraction information EV including the in-point and the out-point (see FIGS. 8 and 9).

By doing this, the image system 10 can generate setting information CLD for generating a more appropriate clip without depending on the performance of the external analysis engine 90. Stated another way, the precision of cutting out an image can be improved without depending on the analysis engine 90.

In the embodiment, an example has been described where, in the second processing, the information processing apparatus 1 (the event analyzer 1A) generates the setting information CLD by using information acquired from connected equipment in the image system 10 (see S214 to S217 in FIG. 9).

By acquiring information from each equipment in the image system 10 and using the information, setting information CLD for generating a clip that is more suitable for the image system 10 can be generated. Stated another way, setting information CLD including information that is suitable for the image system 10 can be generated without depending on analysis of the analysis engine 90.

In the embodiment, an example has been described where, in the second processing, in a case where plural pieces of event extraction information EV using the same event as a target exist as the event extraction information EV that has been received from the analysis engine 90, the information processing apparatus 1 (the event analyzer 1A) generates setting information CLD of a clip image relating to the same event, by using the plural pieces of event extraction information EV (S202 to S208 in FIG. 8).

For example, in a case where a certain scene has been imaged by a plurality of imaging devices 3, plural pieces of event extraction information EV relating to the same event are provided from the analysis engine 90 in some cases. In this case, setting information CLD is generated by using the plural pieces of event extraction information EV using the same event as a target.

By doing this, clip setting information CLD having higher precision can be generated on the basis of images captured by the plurality of imaging devices 3. For example, in-points and out-points of plural pieces of event extraction information can be checked, and setting information can be generated in which an in-point and an out-point have been set to include respective periods. This enables clip cutting-out precision to be improved, for example, such that a clip image CL can be generated that indicates a scene that configures an event without omission.

In the embodiment, an example has been described where, in the second processing, the information processing apparatus 1 (the event analyzer 1A) generates setting information CLD by using information acquired from connected equipment 81 outside the image system (see S210 to S218 in FIG. 9).

By acquiring information from the outside-system equipment 81 and reflecting the information in setting information CLD, a clip image CL including further enriched information can be generated.

Note that, by updating event extraction information EV presented by the analysis engine 90 by using data from the outside-system equipment 81, more desirable setting information CLD can be generated. For example, an in-point and an out-point that have been presented by the analysis engine 90 are changed by using data from the outside-system equipment 81.

For example, by acquiring information having high reliability from the outside, the time of the occurrence of an event is accurately grasped, and an in-point and an out-point are updated. By doing this, setting information CLD for a clip image CL having higher precision can be generated.

In the embodiment, an example has been described where, in the second processing, the information processing apparatus 1 (the event analyzer 1A) generates setting information CLD including metadata control information, by using information acquired from equipment in the image system 10 or the outside-system equipment 81 (S210 to S213 in FIG. 9).

For example, information relating to a player in a soccer broadcast, information relating to the type of an event, such as a goal scene/kickoff scene or an end scene, or the like that corresponds to an image clip can also be added.

By doing this, a clip image CL that the operator OP can easily handle can also be provided. Furthermore, an operation burden imposed on the operator OP can be reduced.

The operator OP can grasp the content of each clip image CL due to the presentation of information based on metadata MT, and can select a clip without time and effort for viewing the content in some cases. This results in remarkable improvements in the efficiency of an operation performed by the operator OP.

Note that the metadata control information may be transmitted separately from an in-point and an out-point serving as setting information CLD. In any case, setting information CLD is a general term for information that the information processing apparatus 1 transmits to the recording device 2 in order to generate a clip, and what data format each individual information to be transferred has or whether or not pieces of information will be simultaneously transmitted is not particularly specified. The similar is applied to the evaluation value described next.

In the embodiment, an example has been described where, in the second processing, the information processing apparatus 1 (the event analyzer 1A) generates setting information CLD including an evaluation value that relates to event extraction (an event extraction degree-of-accuracy score).

If a score serving as an evaluation value is caused to be presented for a clip image CL that has been generated on the basis of such setting information CLD, the operator OP can also select a clip image CL by using the score as reference. Accordingly, for example, a reliable clip image that can be used in a broadcast can be easily selected.

In a case where plural pieces of event extraction information EV using the same event as a target exist as the event extraction information EV that has been received from the analysis engine 90, the information processing apparatus 1 (the event analyzer 1A) according to the embodiment has increased an evaluation value (an event extraction degree-of-accuracy score) for setting information CLD of a clip image relating to the event (S207 in FIG. 8).

In a case where the same scene has been imaged by a plurality of imaging devices and the same scene has been acquired as plural pieces of event extraction information EV, there is a high probability that an important scene that has been imaged by the plurality of imaging devices 3 has been extracted as an event. Accordingly, an evaluation value is increased.

By doing this, it is indicated that event extraction has been appropriately performed, that is, that the analysis engine 90 has extracted an important event, and appropriate information can be added as a guide for clip selection.

Furthermore, the information processing apparatus 1 (the event analyzer 1A) according to the embodiment has changed an evaluation value (an event extraction degree-of-accuracy score) for setting information CLD based on event extraction information, on the basis of operation information (camera data) of the imaging device 3, the operation information relating to a scene indicated by the event extraction information EV (S217 in FIG. 9).

For example, by referring to operation information of an imaging device for a scene designated by event extraction information, whether or not imaging has been appropriately performed can be determined. Accordingly, operation information is referred to, and an evaluation value is changed.

By doing this, in a case where an image of a scene serving as an extracted event is an image having an out-of-focus state and in other cases, an evaluation value can be decreased, for example. Needless to say, in a case where an operation state is appropriate, the evaluation value may be increased. Such an evaluation value (an event extraction degree-of-accuracy score) is appropriate guide information for clip selection.

The information processing apparatus 1 according to the embodiment includes a feedback reception processing unit 1B that receives feedback information FBD from connected equipment in the image system 10, and performs predetermined processing.

The information processing apparatus 1 can perform learning or the like for generating more appropriate setting information, by acquiring information from each equipment in the image system 10, such as the imaging device 3, the recording device 2, or the image transmission control device 4.

In the embodiment, the feedback information FBD has included information relating to a clip image CL that has been used.

For example, selection information (use information) of a clip image CL selected (used) by the operator OP is fed back, and is reflected in predetermined processing.

By feeding back selection information of a clip image in the image transmission control device 4, that is, information relating to a clip image used in a broadcast, the information processing apparatus 1 can learn what clip is likely to be selected, or can generate setting information CLD that matches a tendency of selection, by using a result of learning. By doing this, a clip that is more suitable for use can be generated.

In the embodiment, an example has been described where the information processing apparatus 1 (the feedback reception processing unit 1B) performs operation control on the imaging device 3 as predetermined processing using the feedback information FBD.

For example, by controlling an operation, such as a focus, brightness, or zoom, of the imaging device 3 on the basis of appropriate feedback information FBD, the imaging device 2 can be caused to operate in such a way that there is an advantage in event extraction, and event detection precision can be improved.

Furthermore, by automating operation control performed on the imaging device 3, the number of cameramen can be reduced, and manpower can be saved.

A program according to the embodiment is a program that causes, for example, a CPU, a DSP, or a device including the CPU or the DSP to perform the first processing of FIG. 6 and the second processing of FIGS. 8 and 9 that have been described in the embodiment described above.

Stated another way, the program according to the embodiment is a program that causes the information processing apparatus 1 to perform first processing for converting a received image signal into an image signal for real-time processing and transmitting the image signal to the analysis engine 90 that is located outside, and second processing for receiving event extraction information EV received from the analysis engine 90 and generating setting information CLD of a clip image CL by using the event extraction information EV. The information processing apparatus 1 described above can be implemented by such a program.

Such a program can be recorded, in advance, in an HDD serving as a recording medium incorporated into equipment such as a computer device, a ROM in a microcomputer including a CPU, or the like.

Alternatively, such a program can be transitorily or permanently stored (recorded) in a removable recording medium such as a flexible disk, a compact disc read only memory (CD-ROM), a magnet optical (MO) disk, a digital versatile disc (DVD), a Blu-ray disc (registered trademark)), a magnetic disk, a semiconductor memory, or a memory card. Such a removable recording medium can be provided as what is called package software.

Furthermore, such a program can be installed in a personal computer or the like from the removable recording medium, or can be downloaded from a download site via a network such as a local area network (LAN) or the Internet.

Furthermore, such a program is suitable for providing the information processing apparatus 1 according to the embodiment in a wide range. By downloading the program into, for example, a personal computer, a portable information processing device, an image editing device, broadcast equipment, a portable telephone, game equipment, video equipment, a personal digital assistant (PDA), or the like, the personal computer or the like can be caused to function as the information processing apparatus 1 according to the present disclosure.

Note that the effects described herein are only illustrative and are not restrictive, and other effects may be exhibited.

Note that the present technology can also employ the configuration described below.

(1)

An information processing apparatus including:

an event analyzer that performs first processing for converting a received image signal into an image signal for real-time processing and transmitting the image signal to an analysis engine that is located outside, and second processing for receiving event extraction information that has been received from the analysis engine and generating setting information of a clip image, by using the event extraction information.

(2)

The information processing apparatus described in (1) described above, in which, in the first processing, the event analyzer determines whether or not information amount reduction processing will be performed on the image signal, by using an amount of information of the image signal and band information of a transmission line for transmission to the analysis engine.

(3)

The information processing apparatus described in (2) described above, in which, in the information amount reduction processing, the event analyzer determines an amount of information after reduction, by using the band information and information relating to a precision of the analysis engine, the precision corresponding to the amount of information of the image signal.

(4)

The information processing apparatus described in any of (1) to (3) described above, in which, in the first processing, the event analyzer performs processing for encoding the received image signal into a streaming image signal and transmitting the streaming image signal to the analysis engine.

(5)

The information processing apparatus described in any of (1) to (3) described above, in which, in the first processing, the event analyzer performs processing for dividing the received image signal into image periods having a fixed or unfixed time length, forming image files, and transmitting the image files to the analysis engine.

(6)

The information processing apparatus described in (5) described above, in which the event analyzer generates the image files in which front and rear image files include an overlapping partial scene, the front and rear image files being temporally continuous.

(7)

The information processing apparatus described in any of (1) to (6) described above, in which, in the second processing, the event analyzer generates the setting information obtained by updating an in-point or an out-point of the event extraction information that has been received from the analysis engine, the event extraction information including the in-point and the out-point.

(8)

The information processing apparatus described in any of (1) to (7) described above, in which, in the second processing, the event analyzer generates the setting information by using information acquired from equipment in an image system, the equipment being connected.

(9)

The information processing apparatus described in any of (1) to (8) described above, in which, in the second processing, in a case where plural pieces of the event extraction information using an identical event as a target exist as the event extraction information that has been received from the analysis engine, the event analyzer generates the setting information of a clip image relating to the identical event, by using the plural pieces of the event extraction information.

(10)

The information processing apparatus described in any of (1) to (9) described above, in which, in the second processing, the event analyzer generates the setting information by using information acquired from equipment outside an image system, the equipment being connected.

(11)

The information processing apparatus described in any of (1) to (10) described above, in which, in the second processing, the event analyzer generates the setting information including metadata control information, by using information acquired from equipment in an image system or equipment outside the image system.

(12)

The information processing apparatus described in any of (1) to (11) described above, in which, in the second processing, the event analyzer generates the setting information including an evaluation value relating to event extraction.

(13)

The information processing apparatus described in (12) described above, in which, in a case where plural pieces of the event extraction information using an identical event as a target exist as the event extraction information that has been received from the analysis engine, the event analyzer increases the evaluation value for the setting information of a clip image relating to the identical event.

(14)

The information processing apparatus described in (12) or (13) described above, in which the event analyzer changes the evaluation value for the setting information based on the event extraction information, on the basis of operation information of an imaging device, the operation information relating to a scene indicated by the event extraction information.

(15)

The information processing apparatus described in any of (1) to (14) described above, further including:

a feedback reception processing unit that receives feedback information from equipment in an image system, the equipment being connected, and performs predetermined processing.

(16)

The information processing apparatus described in (15) described above, in which the feedback information includes information relating to a clip image that has been used.

(17)

The information processing apparatus described in (15) or (16) described above, in which the feedback reception processing unit performs operation control on an imaging device as the predetermined processing.

(18)

An information processing method performed by an information processing apparatus, the information processing method including:

first processing for converting a received image signal into an image signal for real-time processing and transmitting the image signal to an analysis engine that is located outside; and second processing for receiving event extraction information that has been received from the analysis engine and generating setting information of a clip image, by using the event extraction information.

(19)

A program that causes an information processing apparatus to perform:

first processing for converting a received image signal into an image signal for real-time processing and transmitting the image signal to an analysis engine that is located outside; and second processing for receiving event extraction information that has been received from the analysis engine and generating setting information of a clip image, by using the event extraction information.

REFERENCE SIGNS LIST

1 Information processing apparatus
1A Event analyzer
1B Feedback reception processing unit
2 Recording device
3 Imaging device
4 Image transmission control device
10 Image system
80 Transmission line
8 Outside-system equipment
90 Analysis engine

The invention claimed is:

1. An information processing apparatus, comprising:
an event analyzer configured to:
receive a first image signal;
perform a first processing that includes:
generation of a plurality of image files including a first image file and a second image file by division of the received first image signal into the plurality of image files, wherein
a scene of a front portion of the second image file overlaps with a scene of a rear portion of the first image file;
conversion of the received first image signal to a second image signal for real-time processing, wherein the conversion is based on the generation of the plurality of image files including the first image file and the second image file; and
transmission of the second image signal to an analysis engine via a transmission line, wherein
the analysis engine is outside the information processing apparatus;
receive event extraction information from the analysis engine, wherein the received event extraction information is generated based on the transmitted second image signal; and
perform a second processing that includes generation of setting information of a clip image, wherein the generation of the setting information is based on the received event extraction information.

2. The information processing apparatus according to claim 1, wherein the event analyzer is further configured to:
determine whether to perform information amount reduction processing on the received first image signal, based on an amount of information of the received first image signal and band information of the transmission line; and
determine the amount of information after reduction, based on the band information and information related to a precision of the analysis engine, wherein the precision corresponds to the amount of information of the received first image signal.

3. The information processing apparatus according to claim 1, wherein, in the first processing, the event analyzer is further configured to:
encode the received first image signal into a streaming image signal; and
transmit the streaming image signal to the analysis engine.

4. The information processing apparatus according to claim 1, wherein, in the first processing, the event analyzer is further configured to divide the received first image signal into a plurality of image periods having one of a fixed or unfixed time length to generate the plurality of image files.

5. The information processing apparatus according to claim 4, wherein
the first image file and the second image file are temporally continuous.

6. The information processing apparatus according to claim 1, wherein, in the second processing, the event analyzer is further configured to generate the setting information obtained by update of one of an in-point or an out-point of the received event extraction information.

7. The information processing apparatus according to claim 1, wherein, in the second processing, the event analyzer is further configured to:
acquire information related to at least one of an imaging direction, a focus state, or a brightness of an image from an equipment in an image system; and
generate the setting information based on the acquired information related to the at least one of the imaging direction, the focus state, or the brightness of the image.

8. The information processing apparatus according to claim 7, wherein
the setting information includes an evaluation value, and the event analyzer is further configured to one of increase or decrease the evaluation value based on the acquired information related to the at least one of the imaging direction, the focus state, or the brightness of the image.

9. The information processing apparatus according to claim 1, wherein, in the second processing, in a case where a plurality of pieces of event extraction information using an identical event as a target is included in the received event extraction information, the event analyzer is further configured to generate the setting information of the clip image related to the identical event, based on the plurality of pieces of event extraction information.

10. The information processing apparatus according to claim 1, wherein, in the second processing, the event analyzer is further configured to:
  acquire information from an equipment outside an image system; and
  generate the setting information based on the acquired information.

11. The information processing apparatus according to claim 1, wherein, in the second processing, the event analyzer is further configured to:
  acquire information from one of an equipment in an image system or an equipment outside the image system; and
  generate the setting information including metadata control information, based on the acquired information.

12. The information processing apparatus according to claim 1, wherein, in the second processing, the event analyzer is further configured to generate the setting information including an evaluation value related to an event extraction.

13. The information processing apparatus according to claim 12, wherein, in a case where a plurality of pieces of event extraction information using an identical event as a target is included in the received event extraction information, the event analyzer is further configured to increase the evaluation value for the setting information of the clip image related to the identical event.

14. The information processing apparatus according to claim 12, wherein
  the event analyzer is further configured to change the evaluation value for the setting information, based on operation information of an imaging device, and
  the operation information is related to a scene indicated by the received event extraction information.

15. The information processing apparatus according to claim 1, further comprising a central processing unit (CPU) configured to receive feedback information from an equipment in an image system.

16. The information processing apparatus according to claim 15, wherein the feedback information includes information related to the clip image that is used.

17. The information processing apparatus according to claim 15, wherein the CPU is further configured to perform operation control on an imaging device.

18. An information processing method, comprising:
  receiving a first image signal;
  performing a first processing that includes:
    generating a plurality of image files including a first image file and a second image file by division of the received first image signal into the plurality of image files, wherein
      a scene of a front portion of the second image file overlaps with a scene of a rear portion of the first image file;
    converting the received first image signal to a second image signal for real-time processing, wherein the conversion is based on the generation of the plurality of image files including the first image file and the second image file;
    and
    transmitting the second image signal to an analysis engine via a transmission line, wherein
      the analysis engine is outside an information processing apparatus;
  receiving event extraction information from the analysis engine, wherein the received event extraction information is generated based on the transmitted second image signal; and
  performing a second processing that includes generating setting information of a clip image, wherein the generation of the setting information is based on the received event extraction information.

19. A non-transitory computer-readable medium having stored thereon computer-executable instructions which, when executed by a processor, cause the processor to execute operations, the operations comprising:
  receiving a first image signal;
  performing a first processing that includes:
    generating a plurality of image files including a first image file and a second image file by division of the received first image signal into the plurality of image files, wherein
      a scene of a front portion of the second image file overlaps with a scene of a rear portion of the first image file;
    converting the received first image signal to a second image signal for real-time processing, wherein the conversion is based on the generation of the plurality of image files including the first image file and the second image file;
    and
    transmitting the second image signal to an analysis engine via a transmission line, wherein
      the analysis engine is outside an information processing apparatus;
  receiving event extraction information from the analysis engine, wherein the received event extraction information is generated based on the transmitted second image signal; and
  performing a second processing that includes generating setting information of a clip image, wherein the generation of the setting information is based on the received event extraction information.

* * * * *